United States Patent
Ullah et al.

(10) Patent No.: US 10,882,948 B2
(45) Date of Patent: *Jan. 5, 2021

(54) COPOLYMER FOR PHOTOELECTROCATALYTIC WATER SPLITTING

(71) Applicant: King Fahd University of Petroleum and Minerals, Dhahran (SA)

(72) Inventors: Nisar Ullah, Dhahran (SA); Muhammad Mansha, Dhahran (SA); Ibrahim Khan, Dhahran (SA); Manzar Sohail, Dhahran (SA); Ahsanulhaq Qurashi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,768

(22) Filed: Apr. 18, 2018

(65) Prior Publication Data

US 2019/0322797 A1  Oct. 24, 2019

(51) Int. Cl.
*C08G 61/12* (2006.01)
*C25B 1/00* (2006.01)
*C25B 1/04* (2006.01)
*C25B 11/04* (2006.01)
*C08F 2/00* (2006.01)

(52) U.S. Cl.
CPC ............ *C08G 61/124* (2013.01); *C25B 1/003* (2013.01); *C25B 1/04* (2013.01); *C25B 11/0405* (2013.01); *C25B 11/0426* (2013.01); *C25B 11/0447* (2013.01); *C08G 2261/12* (2013.01); *C08G 2261/312* (2013.01); *C08G 2261/344* (2013.01); *C08G 2261/5222* (2013.01)

(58) Field of Classification Search
CPC .................................................... C08G 61/124
USPC ........................................................ 528/422
See application file for complete search history.

(56) References Cited

U.S. PATENT DOCUMENTS

| 9,455,059 B2 * | 9/2016 | Blouin .................. C08G 61/124 |
| 2014/0239157 A1 * | 8/2014 | Burgess .................. H01J 31/26 |
| | | 250/208.1 |

FOREIGN PATENT DOCUMENTS

CN    1569910 A    1/2005

OTHER PUBLICATIONS

Mansha et al; Visible light—poly(phenylene cyanovinylenes); Elsevier Ltd; Journal; (2017), 143, 95-103; chem Abstract 167: 130260. (see pp. 9-11 of 15955768 EICSEARCH) (Year: 2017).*

Mansha, Muhammad, et al., Visible-light driven photocatalytic oxygen evolution reaction from new poly(phenylene cyanovinylenes), Aug. 2017, Abstract; https://www.sciencedirect.com/science/article/pii/S0143720816314516; 2 pages.

* cited by examiner

*Primary Examiner* — Duc Truong
(74) *Attorney, Agent, or Firm* — Oblon, McClelland, Maier & Neustadt, L.L.P.

(57) ABSTRACT

A copolymer containing carbazole- and cyanovinylene-based moieties, a photoelectrode comprising a metal oxide substrate and the copolymer as a photoelectrocatalyst component to the photoelectrode, as well as a photoelectrochemical cell including the photoelectrode. Methods of producing the copolymers, and methods of using the photoelectrochemical cell to produce hydrogen gas and oxygen gas through water splitting are also provided.

20 Claims, 14 Drawing Sheets

COPOLYMER FOR PHOTOELECTROCATALYTIC WATER SPLITTING

STATEMENT OF FUNDING ACKNOWLEDGEMENT

This project was funded by King Fand University of Petroleum and Minerals (KFUPM) under project number NUS15103/4.

STATEMENT REGARDING PRIOR DISCLOSURE BY THE INVENTORS

Aspects of this technology are described in an article "Visible-light driven photocatalytic oxygen evolution reaction from new poly(phenylene cyanovinylenes)" published in Dyes and Pigments, 2017, 143, 95-102, on Apr. 19, 2017, which is incorporated herein by reference in its entirety.

BACKGROUND OF THE INVENTION

Technical Field

The present disclosure relates to a copolymer and methods of its synthesis. Additionally, the present disclosure relates to a photoelectrode containing the copolymer and a method of using the photoelectrode as part of a photoelectrochemical cell for producing hydrogen gas and oxygen gas.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The ever-increasing global consumption of energy mandates renewable energy technologies that can help avoid the effects of anthropogenic climate change caused by fossil fuels. $H_2$ is regarded as an ultimate clean energy and the fuel of the future because of its high energy density per mass and clean burning process that generates only $H_2O$ after consumption [Hu S, Xiang C, Haussener S, Berger A D, Lewis N S. An analysis of the optimal band gaps of light absorbers in integrated tandem photoelectrochemical water-splitting systems. Energy Environ Sci 2013; 6:2984; and Schlögl R. The Role of Chemistry in the Energy Challenge. ChemSusChem 2010; 3:209-22]. Among various solar energy conversion methods, photoelectrocatalytic (PEC) splitting of water into $H_2$ and $O_2$ using semiconductor photocatalysts transforms solar energy into chemical fuels in the form of $H_2$ [Yu H, Shi R, Zhao Y, Waterhouse G I N, Wu L-Z, Tung C-H, Zhang T. Smart Utilization of Carbon Dots in Semiconductor Photocatalysis. Adv Mater 2016; 28:9454-77; and Zhao Y, Jia X, Waterhouse G I N, Wu L-Z, Tung C-H, O'Hare D, Zhang T. Layered Double Hydroxide Nanostructured Photocatalysts for Renewable Energy Production. Adv Energy Mater 2016; 6:1501974]. Moreover, this process is a renewable, clean, and cost-effective route to produce $H_2$ [Tributsch H. Photovoltaic hydrogen generation. Int J Hydrogen Energy 2008; 33:5911-30; and Zeng K, Zhang D. Recent progress in alkaline water electrolysis for hydrogen production and applications. Prog Energy Combust Sci 2010; 36:307-26]. The module design of PEC systems is based on two-electrode systems, where hydrogen evolution reaction (HER) occurs at the cathode while oxygen evolution reaction (OER) proceeds at the anode. Because of a four-electron-proton coupled reaction, higher energy (higher overpotential) is required to overcome the kinetic barrier of OER. Electrons and protons released during oxygen evolution are crucial for solar-fuel generation, which makes photocatalytic OER useful for $H_2$ production and $CO_2$ fixation [Duan L, Bozoglian F, Mandal S, Stewart B, Privalov T, Llobet A & Sun L. A molecular ruthenium catalyst with water-oxidation activity comparable to that of photosystem II. Nature Chemistry 2012; 4; 418-423; and Zhang G, Zang S, and Wang X. Layered $Co(OH)_2$ deposited polymeric carbon nitrides for photocatalytic water oxidation. ACS Catal., 2015; 5(2); 941-947, each incorporated herein by reference in their entirety]. Currently, electrocatalytic OER is less advanced compared to hydrogen evolution reaction (HER). Consequently, increasing attention and effort have been directed to developing an OER catalyst with improved electrode kinetics and stability under different electrolyte environments [Ran J, Zhang J, Yu J, Jaroniec M, Qiao S Z. Earth-abundant cocatalysts for semiconductor-based photocatalytic water splitting. Chem Soc Rev 2014; 43:7787-812; and Hisatomi T, Kubota J, Domen K. Recent advances in semiconductors for photocatalytic and photoelectrochemical water splitting. Chem Soc Rev 2014; 43:7520-35, each incorporated herein by reference in their entirety]. However, most effective OER catalysts introduced so far are Ru- and Ir-based inorganic materials which are impaired by their high cost and limited availability [Zhao Y, Chen G, Bian T, Zhou C, Waterhouse G. I, Wu L. Z and Zhang T. Defect-rich ultrathin ZnAl-layered double hydroxide nanosheets for efficient photoreduction of $CO_2$ to CO with water. Adv. Mater., 2015, 27, 7824-7831, incorporated herein by reference in its entirety]. On the other hand, use of cheaper metals such as Ni and Co suffers from corrosion and passivation [Trasatti S. Wendt H. The oxygen evolution reaction in electrochemical hydrogen technologies. Elsevier, Amsterdam, 1990, p. 1-14, incorporated herein by reference in its entirety]. Therefore, an efficient, low-cost and stable OER catalyst is highly desirable.

Conjugated polymers having a delocalized π electron system can absorb sunlight. Therefore, they have been utilized in the development of photovoltaic devices and solar cells [Cheng Y-J, Yang S-H, Hsu C-S. Synthesis of conjugated polymers for organic solar cell applications. Chem Rev 2009; 109:5868-923; and Zhang G, Lami V, Rominger F, Vaynzof Y, Mastalerz M. Rigid Conjugated Twisted Truxene Dimers and Trimers as Electron Acceptors. Angew Chemie Int Ed 2016; 55:3977-81, each incorporated herein by reference in their entirety]. The discovery of poly(p-phenylene)s) as a photocatalyst for water splitting in 1985 spurred research interests in developing new conjugated photocatalysts [Yanagida S, Kabumoto A, Mizumoto K, Pac C, Yoshino K. Poly(p-phenylene)-catalysed photoreduction of water to hydrogen. J Chem Soc Chem Commun 1985:

474, incorporated herein by reference in its entirety]. As a result, organic dyes based on perylene diimides or porphyrins, conjugated microporous network polymers (CMPs) [Sprick R S, Bonillo B, Clowes R, Guiglion P, Brownbill N J, Slater B J, Blanc F, Zwijnenburg M A, Adams D J, Cooper A I. Visible-Light-Driven Hydrogen Evolution Using Planarized Conjugated Polymer Photocatalysts. Angew Chemie Int Ed 2016; 55:1792-6, incorporated herein by reference in its entirety] and carbon nitride based materials [Wang X, Maeda K, Thomas A, Takanabe K, Xin G, Carlsson J M, Domen K, & Antonietti M. A metal-free polymeric photocatalyst for hydrogen production from water under visible light. Nat Mater 2009; 8:76-80, incorporated herein by reference in its entirety] have been tested for solar water splitting. However, harsh conditions of PEC water oxidation [Singh R, Aluicio-Sarduy E, Kan Z, Ye T, MacKenzie RCI, Keivanidis P E. Fullerene-free organic solar cells with an efficiency of 3.7% based on a low-cost geometrically planar perylene diimide monomer. J Mater Chem A 2014; 2:14348, incorporated herein by reference in its entirety] and difficulty in solution-processing of organic dye based materials due to aggregation made searching for a suitable π-conjugated material challenging. In addition, conjugated polymer based photocatalysts with sacrificial electron donors have been extensively used as HER catalysts, although reports on their photocatalytic performance for OER processes are limited [Guiglion P, Butchosa C and Zwijnenburg M. A. Polymeric watersplitting photocatalysts; a computational perspective on the water oxidation conundrum. J. Mater. Chem. A, 2014; 2; 11996; Chu S, Wang Y, Guo Y, Feng J, Wang C, Luo W, Fan X and Zou Z. Band Structure Engineering of Carbon Nitride: In Search of a Polymer Photocatalyst with High Photooxidation Property. ACS Catal., 2013; 3 (5); 912-919; and Ge L, Han C, Xiao X, Guo L. In situ synthesis of cobalt-phosphate (Co-Pi) modified g-$C_3N_4$ photocatalysts with enhanced photocatalytic activities. Appl Catal B Environ 2013; 142:414-22, each incorporated herein by reference in their entirety]. Therefore, the development of robust semiconducting materials with optimum optical gap and low cost is highly desirable. A systematic adjustment of structure and properties at the molecular level is difficult for inorganic photocatalysts. On the contrary, organic conjugated polymers are promising high-performance metal-free photocatalysts for water splitting due to their chemical versatility, tunable band bap, physicochemical properties, and accessibility [Liu G, Wang T, Zhang H, Meng X, Hao D, Chang K, Li P, Kako T, Ye J. Nature-Inspired Environmental "Phosphorylation" Boosts photocatalytic $H_2$ production over carbon nitride nanosheets under visible-light irradiation. Angew Chemie Int Ed 2015; 54:13561-5; Han Q, Wang B, Zhao Y, Hu C, Qu L. A graphitic-$C_3N_4$ "seaweed" architecture for enhanced hydrogen evolution. Angew Chemie Int Ed 2015; 54:11433-7; Zheng Y, Lin L, Wang B, Wang X. Graphitic carbon nitride polymers toward sustainable photoredox catalysis. Angew Chem Int Ed 2015; 54:12868-84; and Schwinghammer K, Mesch M B, Duppel V, Ziegler C, Senker J, Lotsch B V. Crystalline carbon nitride nanosheets for improved visible-light hydrogen evolution. J Am Chem Soc 2014; 136:1730-3, each incorporated herein by reference in their entirety]. In addition, high absorption coefficients of organic semiconductors and ease of their deposition on low-cost substrates [Li G, Zhu R, Yang Y. Polymer solar cells. Nat Photonics 2012; 6:153-61, incorporated herein by reference in its entirety] make them ideal substances to absorb incident photons efficiently [Janssen R A J, Nelson J. Factors limiting device efficiency in organic photovoltaics. Adv Mater 2013; 25:1847-58; and Groves C, Reid O G, Ginger D S. Heterogeneity in polymer solar cells: Local morphology and performance in organic photovoltaics studied with scanning probe microscopy. Acc Chem Res 2010; 43:612-20, each incorporated herein by reference in their entirety]. Polymeric photocatalysts with a narrow band gap have improved light harvesting ability and produce sufficient charge carriers [Gao J, Chen W, Dou L, Chen C-C, Chang W-H, Liu Y, et al. Elucidating double aggregation mechanisms in the morphology optimization of diketopyrrolopyrrole-based narrow bandgap polymer solar cells. Adv Mater 2014; 26:3142-7; and Matsuoka S, Kohzuki T, Nakamura A, Pac C, Yanagida S. Efficient visible-light-driven photocatalysis. Poly(pyridine-2,5-diyl)-catalysed hydrogen photoevolution and photoreduction of carbonyl compounds. J Chem Soc Chem Commun 1991; 39:580, each incorporated herein by reference in their entirety]. Additionally, an extended conjugation length can improve exciton/polaron migration along the polymer chain. Finally, a band edge at the redox window of water splitting potentials and stability towards water corrosion are also important for a photocatalyst [Yanagida S, Ogata T, Kuwana Y, Wada Y, Murakoshi K, Ishida A, Takamuku S, Kusaba M, Nakashima N. Synthesis of 2,':5',2"-terpyridine and 2,2':5',2":5"',2"'-quaterpyridine and their photocatalysis of the reduction of water. J Chem Soc, Perkin Trans 2 1996; 88:1963-9, incorporated herein by reference in its entirety]. Studies have revealed that the planarity and degree of conjugation of linear conjugated phenylenes can be enhanced by introducing methylene bridges or other bridging functionalities to the conjugated polymers [Mansha M, Sohail M, Ullah N. Synthesis, characterization, and properties of new 3-hexyl-2,5-diphenylthiophene: Phenylene vinylenes copolymers as colorimetric sensor for iodide anion. J Appl Polym Sci 2017; 134: 44948; Mansha M, Khan I, Ullah N, Qurashi A. Synthesis, characterization and visible-light-driven photoelectrochemical hydrogen evolution reaction of carbazole-containing conjugated polymers. Int J Hydrogen Energy 2017. doi: 10.1016/j.ijhydene.2017.02.053; and Siddiqui M N, Mansha M, Mehmood U, Ullah N, Al-Betar A F, Al-Saadi A A. Synthesis and characterization of functionalized polythiophene for polymer-sensitized solar cell. Dye Pigment 2017; 141:406-12, each incorporated herein by reference in their entirety]. For example, polymers containing carbazole, dibenzo[b,d]thiophene sulfone or dibenzo[b,d]thiophene units with linear p-phenylenes demonstrated higher degrees of conjugation and lower band gaps compared to their unfused counterparts.

In view of the forgoing, one objective of the present disclosure is to provide a copolymer containing carbazole and cyanovinylene repeating units capable of photoelectrocatalysis. The copolymer may be deposited on a substrate and used as a photoelectrode in a photoelectrochemical cell for water splitting.

BRIEF SUMMARY OF THE INVENTION

According to a first aspect, the present disclosure relates to a copolymer of formula (I)

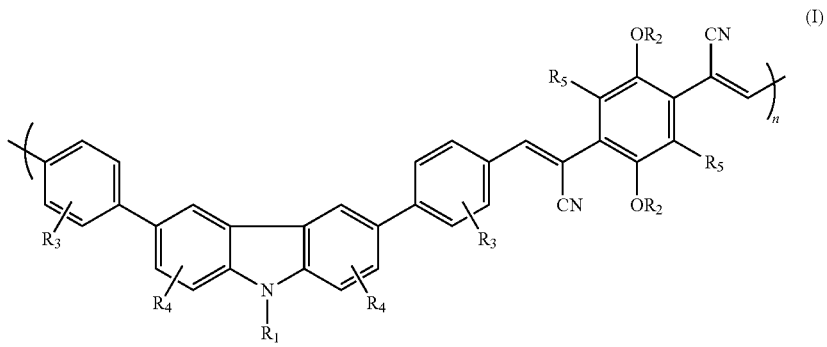

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl, (ii) each $R_2$ is independently selected from the group consisting of an optionally substituted alkyl, an optionally substituted cycloalkyl, an optionally substituted arylalkyl, and an optionally substituted aryl, (iii) each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (iv) each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl, (v) each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, and (vi) n is a positive integer in a range of 2-10,000.

In one embodiment, each $R_3$, $R_4$ and $R_5$ are a hydrogen, $R_1$ is a hydrogen or an optionally substituted alkyl, and each $R_2$ is independently an optionally substituted alkyl.

In one embodiment, $R_1$ is 2-ethylhexyl, and each $R_2$ is independently 2-ethylhexyl or dodecyl.

In one embodiment, the copolymer has a formula selected from the group consisting of

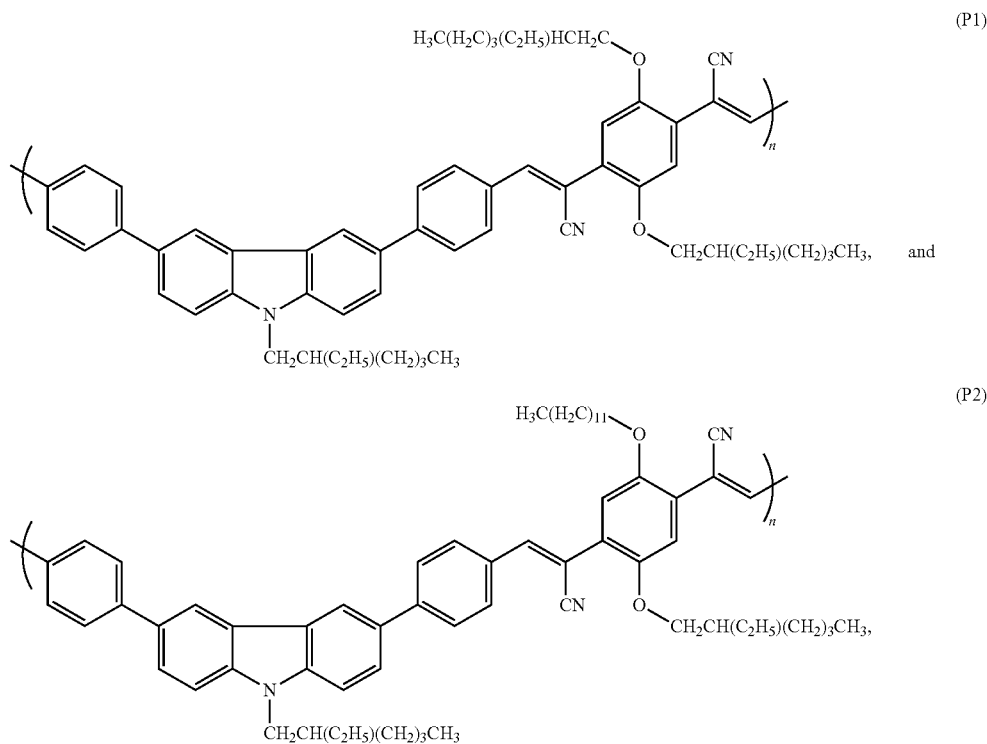

wherein n is a positive integer in the range of 2-10000 for each of formulae (P1) and (P2).

In one embodiment, the copolymer is in the form of microspheres having a diameter of 0.5-5 µm.

In one embodiment, the copolymer has a BET surface area of 30-120 m$^2$/g, and a pore size of 8-25 Å.

In one embodiment, the copolymer has a band gap energy of 2.3-3.0 eV.

In one embodiment, the copolymer has a fluorescence emission peak of 510-570 nm upon excitation at a wavelength of 380-400 nm.

According to a second aspect, the present disclosure relates to a method of producing the copolymer of the first aspect. The method involves reacting a dialdehyde of formula (II)

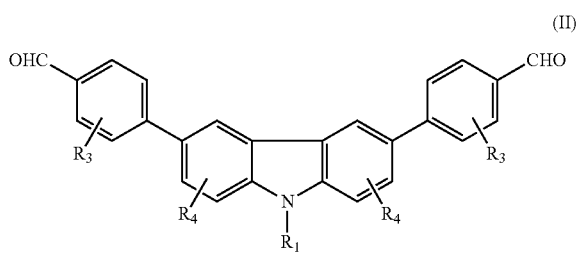

(II)

or a salt, solvate, tautomer or stereoisomer thereof, with a dinitrile of formula (III)

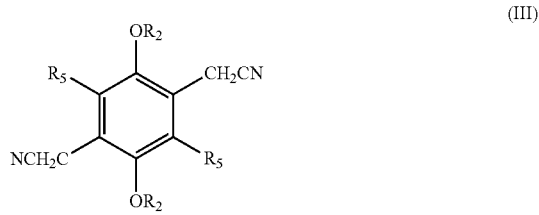

(III)

or a salt, solvate, tautomer or stereoisomer thereof in the presence of a base to form the copolymer, wherein (i) $R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl, (ii) each $R_2$ is independently selected from the group consisting of an optionally substituted alkyl, an optionally substituted cycloalkyl, an optionally substituted arylalkyl, and an optionally substituted aryl, (iii) each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (iv) each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl, and (v) each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano.

In one embodiment, a molar ratio of the dialdehyde of formula (II) to the dinitrile of formula (III) is in a range of 1:2 to 2:1.

According to a third aspect, the present disclosure relates to a photoelectrode, comprising a metal oxide conducting substrate, and a layer comprising the copolymer of formula (I) of the first aspect deposited over the metal oxide conducting substrate. Additionally, the layer has a thickness in a range of 5-500 nm.

In one embodiment, the metal oxide conducting substrate is fluorine doped tin oxide.

In one embodiment, the photoelectrode has an ultraviolet visible absorption with an onset absorption edge in a range of 450-550 nm.

According to a fourth aspect, the present disclosure relates to a photoelectrochemical cell, including the photoelectrode of the third aspect, a counter electrode, and an electrolyte solution comprising water and an inorganic salt in contact with both electrodes.

In one embodiment, the electrolyte solution has an inorganic salt concentration of 0.05-1 M, and a pH in a range of 5-9.

In one embodiment, the photoelectrode has a photo-current density in a range of 0.2-0.5 µA/cm$^2$ when the electrodes are subjected to a potential of 0.25 to 0.75 V under visible light irradiation.

In one embodiment, the photoelectrode has a photo-current density in a range of 0.01-0.5 mA/cm$^2$ when the electrodes are subjected to a potential of 0.8 to 2.0 V under visible light irradiation.

In one embodiment, the photoelectrochemical cell further comprises a reference electrode in contact with the electrolyte solution.

In one embodiment, the photo-current density decreases by less than 25% after subjecting the electrodes to a potential of 0.25 to 0.75 V under visible light irradiation for 2-8 hours, relative to that measured immediately after the subjecting commences.

According to a fifth aspect, the present disclosure relates to a method of splitting water into hydrogen gas and oxygen gas. The method involves subjecting the electrodes of the photoelectrochemical cell of the fourth aspect to a potential of 0.25 to 2.0 V, and concurrently irradiating the photoelectrochemical cell with visible light, thereby forming hydrogen gas and oxygen gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
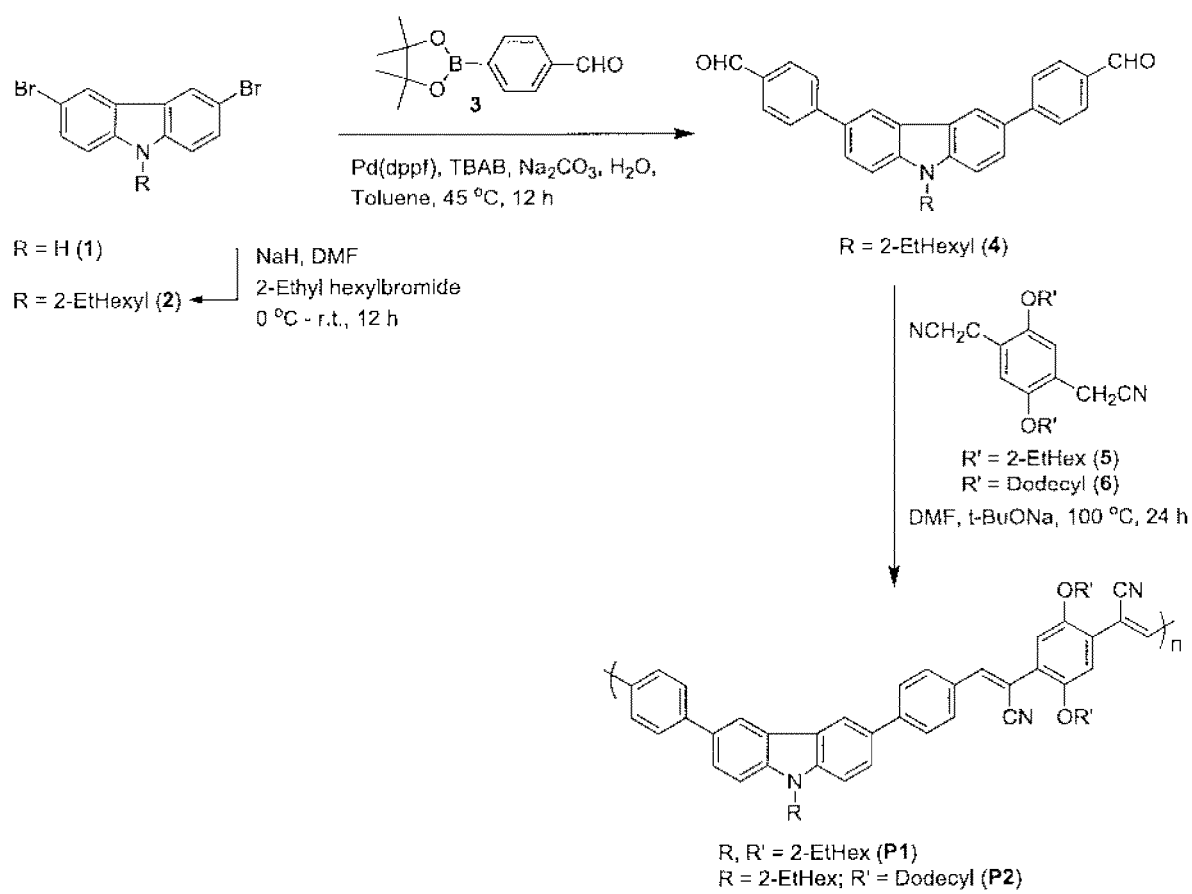
FIG. 1 is a synthetic scheme for copolymers of formulae (P1) and (P2).

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{15}N$, and isotopes of oxygen include $^{17}O$ and $^{18}O$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{20}$, preferably $C_6$-$C_{18}$, more preferably $C_{10}$-$C_{16}$, for example $C_1$, $C_2$, $C_3$, $C_4$, $C_5$, $C_6$, $C_7$, $C_8$, $C_9$, $C_{10}$, $C_{11}$, $C_{12}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, and as known to those skilled in the art.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "alkanoyl" refers to an alkyl group of specified number of carbon atoms that is bound to an oxygen atom through a double bond. Exemplary alkanoyl groups include, but are not limited to, formyl, acetyl, propanoyl, butyryl, and hexanoyl.

The term "aroyl" as used in this disclosure refers to an aromatic carboxylic acyl group includes, for example, benzoyl, 1-naphthoyl, and 2-naphthoyl.

The term "halogen", as used herein, means fluoro, chloro, bromo and iodo.

According to a first aspect, the present disclosure relates to a copolymer of formula (I)

together successively along the chain. Monomers are molecules which can undergo polymerization, thereby contributing constitutional repeating units to the structures of a macromolecule or polymer. The process by which monomers combine end to end to form a polymer is referred to herein as "polymerization" or "polycondensation". As used herein a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers

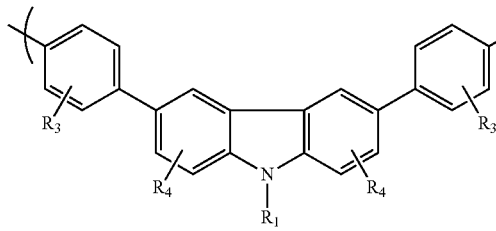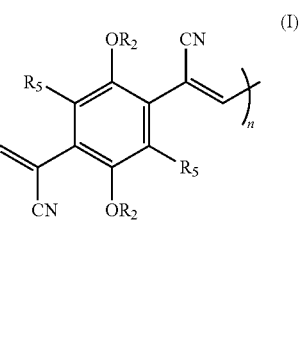

or a salt thereof, a solvate thereof, a tautomer thereof, a stereoisomer thereof, or a mixture thereof wherein (i) $R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl, (ii) each $R_2$ is independently selected from the group consisting of an optionally substituted alkyl, an optionally substituted cycloalkyl, an optionally substituted arylalkyl, and an optionally substituted aryl, (iii) each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (iv) each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl, (v) each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, and (vi) n is a positive integer in a range of 2-10,000.

As described herein, the term "repeat unit" or "repeating unit" refers to a part of the polymer or resin whose repetition would produce the complete polymer chain (including or excluding the end groups) by linking the repeating units and those obtained from four monomers may be termed quarterpolymers, etc. In some embodiments, the copolymer of the present disclosure is a terpolymer, for example a terpolymer obtained from reaction between a dialdehyde and a mixture of two dinitriles. In a preferred embodiment, the copolymer of the present disclosure is a bipolymer obtained from reaction between a dialdehyde and a dinitrile.

The term "degree of polymerization" refers to the number of repeating units in a polymer. In a preferred embodiment, degree of polymerization n is a positive integer in the range of 2-10,000, preferably 3-1,000, preferably 4-500, preferably 5-100, preferably 6-90, preferably 7-80, preferably 8-70, preferably 9-60, preferably 10-50, preferably 11-40, preferably 12-30, preferably 13-25, preferably 14-20. It is equally envisaged that values for n may fall outside of these ranges and still provide suitable copolymers of formula (I). In a preferred embodiment, the copolymer of the present disclosure may have a wide molecular weight distribution. In one embodiment, the copolymer of the present disclosure has an average molecular weight of 2-100 kDa, preferably 5-80 kDa, preferably 10-60 kDa, preferably 15-40 kDa, preferably 18-35 kDa, preferably 20-30 kDa.

In one or more embodiments, each $R_3$, $R_4$ and $R_5$ are a hydrogen. In one or more embodiments, $R_1$ is a hydrogen or an optionally substituted alkyl. Within the same repeating unit, each $R_2$ may be the same or may be different groups. In one or more embodiments, each $R_2$ is independently an optionally substituted alkyl.

In one or more embodiments, $R_1$ is a $C_4$ to $C_{10}$ alkyl group, preferably a $C_5$ to $C_9$ alkyl group, more preferably a $C_8$ alkyl group, most preferably 2-ethylhexyl, and each $R_2$ is independently a $C_6$ to $C_{14}$ alkyl group, preferably a $C_7$ to $C_{13}$ alkyl group, more preferably a $C_8$ to $C_{12}$ alkyl group, most preferably 2-ethylhexyl or dodecyl.

In one or more embodiments, the copolymer has a formula selected from the group consisting of

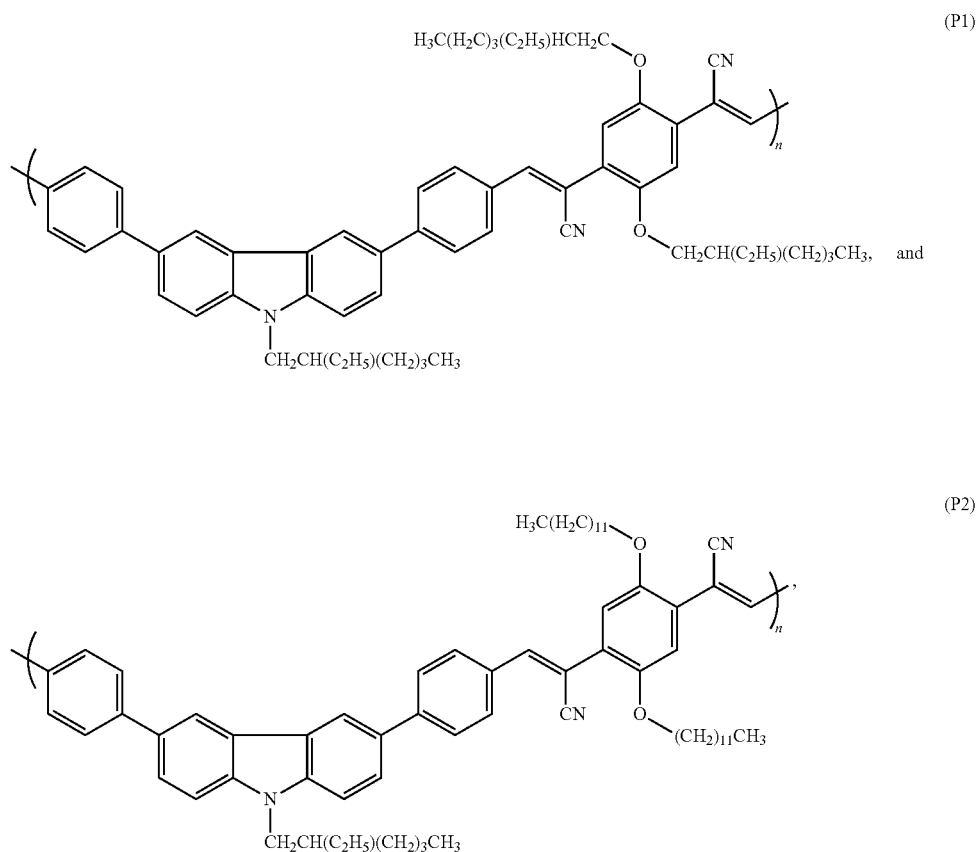

wherein n is a positive integer in the range of 2-10,000, preferably 3-1,000, preferably 4-500, preferably 5-100, preferably 6-90, preferably 7-80, preferably 8-70, preferably 9-60, preferably 10-50, preferably 11-40, preferably 12-30, preferably 13-25, preferably 14-20, for each of formulae (P1) and (P2).

There are in principle a relatively large number of different reactions for the formation of alkene (C=C) bond suitable for the purpose of current disclosure, which include, but are not limited to, Wittig reaction, Peterson olefination, Barton-Kellogg reaction, McMurry reaction, Ramberg-Backlund rearrangement, and Olefin metathesis. Knoevenagel condensation, which is a modification of aldol condensation, converts an aldehyde or ketone and a reactant with active hydrogens to an olefin in the presence of a basic catalyst. In at least one embodiment, Knoevenagel type polymerization reactions are utilized to prepare the copolymer of formula (I).

According to a second aspect, the present disclosure relates to a method of producing the copolymer of the first aspect. The method involves reacting a dialdehyde of formula (II)

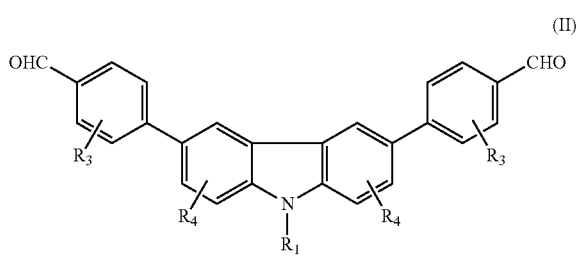

(II)

or a salt, solvate, tautomer or stereoisomer thereof, with a dinitrile of formula (III)

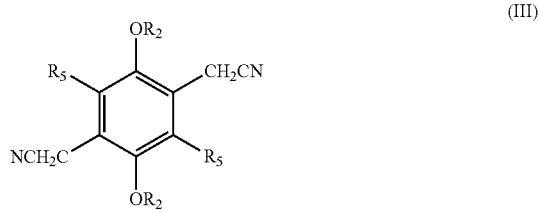

(III)

or a salt, solvate, tautomer or stereoisomer thereof in the presence of a base to form the copolymer, wherein (i) $R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl, (ii) each $R_2$ is independently selected from the group consisting of an optionally substituted alkyl, an optionally substituted cycloalkyl, an optionally substituted arylalkyl, and an optionally substituted aryl, (iii) each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (iv) each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl, and (v) each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano.

In a preferred embodiment, reacting the dialdehyde with the dinitrile in the presence of a base to form the copolymer of formula (I) is performed in a polar aprotic solvent (e.g. tetrahydrofuran, dimethylformamide, acetonitrile) under agitation, preferably a magnetic stirrer at a temperature of 20-120° C., preferably 30-110° C., preferably 40-100° C., preferably 50-90° C., preferably 60-80° C., or about 70° C. for up to 24 hours, preferably 2-20 hours, preferably 4-18 hours, preferably 6-16 hours, preferably 8-14 hours, or about 12 hours. In a preferred embodiment, the reaction is performed at a concentration of the dialdehyde in the range of 0.1-1,000 mM, preferably 0.5-500 mM, preferably 1-100 mM, preferably 10-50 mM, preferably 20-40 mM. In a preferred embodiment, the reaction is performed at a concentration of the dinitrile in the range of 0.1-1,000 mM, preferably 0.5-500 mM, preferably 1-100 mM, preferably 10-50 mM, preferably 20-40 mM. The base may be present at a concentration in the range of 1-3,000 mM, preferably 10-1,000 mM, preferably 25-250 mM, preferably 50-100 mM. Exemplary bases that may be suitable for the reaction include, but are not limited to, sodium tert-butoxide, potassium tert-butoxide, 1,8-diazabicycloundec-7-ene, 1,5-diazabicyclo(4.3.0)non-5-ene, n-butyllithium, tert-butyllithium, lithium diisopropylamide, sodium hydride, potassium hydride, sodium methoxide, and sodium carbonate, preferably sodium tert-butoxide is employed. In a preferred embodiment, a molar ratio of the dialdehyde of formula (II) to the dinitrile of formula (III) is in the range of 1:3 to 3:1, preferably 1:2 to 2:1, preferably 2:3 to 3:2, or about 1:1. In a preferred embodiment, a molar ratio of the dialdehyde to the base is in the range of 3:1 to 1:20, preferably 2:1 to 1:10, preferably 1:1 to 1:5, preferably 1:2 to 1:4, or about 1:3.

In a preferred embodiment, the copolymer is collected as a solid that may be precipitated and separated (filtered off) from the aforementioned reaction, washed in methanol, treated with an acid (e.g. acetic acid, hydrochloric acid), and then filtered and dried. In a preferred embodiment, the aforementioned reaction forming the copolymer of formula (I) has a product yield of at least 40%, preferably at least 50%, preferably at least 55%, preferably at least 60%, preferably at least 65%, preferably at least 70%, preferably at least 80%. The product yield is calculated as (mass of product/mass of reactants, i.e., dialdehyde+dinitrile)×100%.

The starting monomers used in the aforementioned methods including dialdehydes and dinitriles may be commercially available or prepared in-house according to methods known to one of ordinary skill in the art. For example, details regarding the synthetic procedures for the dinitriles of formula (III) may be found in, e.g. Egbe D A M, Ulbricht C, Orgis T, Carbonnier B, Kietzke T, Peip M, Metzner M, Gericke, M, Birckner F, Pakula T, Neher D, Grummt U-W. Odd-Even Effects and the Influence of Length and Specific Positioning of Alkoxy Side Chains on the Optical Properties of PPE-PPV Polymers. Chem Mater 2005; 17:6022-32; Zhu X, Traub M C, Vanden Bout D A, Plunkett K N. Well-Defined Alternating Copolymers of Oligo(phenylenevinylene)s and Flexible Chains. Macromolecules 2012; 45:5051-7; and Thompson B C, Kim Y-G, McCarley T D, Reynolds J R. Soluble Narrow Band Gap and Blue Propylenedioxythiophene-Cyanovinylene Polymers as Multifunctional Materials for Photovoltaic and Electrochromic Applications. J. Am. Chem. Soc., 2006, 128 (39), 12714-12725, each incorporated herein by reference in their entirety. For another example, the dialdehyde of formula (II) may be prepared by the Suzuki-Miyaura method as follows. A boronic ester of formula (II-i)

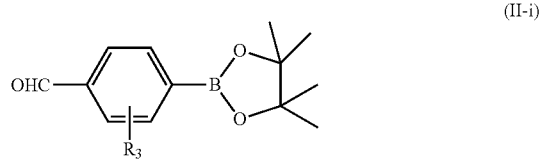

(II-i)

may be mixed with a suitable 3,6-dihalocarbazole of formula (II-ii)

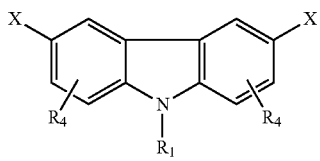

(II-ii)

wherein each X is a halogen including chloro, bromo and iodo, preferably each X is a bromo in the presence of a base (e.g. sodium carbonate, potassium carbonate, sodium hydroxide, potassium hydroxide, sodium tert-butoxide, potassium tert-butoxide) and a catalyst (e.g. [1,1'-bis(diphenylphosphino)ferrocene]dichloropalladium(II) [PdCl$_2$(dppf)], palladium-tetrakis(triphenylphosphine) [Pd(PPh$_3$)$_4$], palladium(II) acetate [Pd(OAc)$_2$], bis(dibenzylideneacetone)palladium [Pd(dba)$_2$]) in a solvent (e.g. water, toluene, methanol, ethanol, dioxane, tetrahydrofuran, or mixtures thereof), thereby forming a mixture. A concentration of boronic ester of formula (II-i) in the mixture may be in the range of 0.01-2.0 M, 0.1-1.0 M, or 0.2-0.4 M. A concentration of 3,6-dihalocarbazole of formula (II-ii) in the mixture may be in the range of 0.001-1.0 M, 0.01-0.5 M, or 0.05-0.2 M. A concentration of base in the mixture may be in the range of 0.01-4 M, 0.1-2 M, or 0.3-1.0 M. A concentration of catalyst in the mixture may be in the range of 0.005-0.2 M, 0.01-0.1 M, or 0.02-0.05 M. A molar ratio of the boronic ester to the 3,6-dihalocarbazole may be in the range of 1:1 to 5:1, 2:1 to 4:1, or about 2.5:1. A molar ratio of the boronic ester to the base may be in the range of 1:1 to 1:4, or 1:2 to 1:3. A molar ratio of the boronic ester to the catalyst may be in the range of 100:1 to 5:1, 50:1 to 10:1, or 25:1 to 10:1. The reaction may be performed under an inert gas such as N$_2$, Ar, He. For example, the inert gas may be bubbled in the reaction mixture for at least 0.5 hour, 1 hour, or at least 2 hours before and/or during the reaction. The mixture may be agitated and/or heated to a temperature range of 30–100° C., 40-70° C., or 45-60° C. by an oil-bath, a water-bath, or a sand-bath for 1 to 24 hours, 3 to 18 hours, 6 to 15 hours, or about 12 hours to form a final reaction mixture. Subsequently, the dialdehyde of formula (II) may be isolated and purified from the final reaction mixture using methods known to one skilled in the art such as filtration, work-up, extraction with organic solvents, distillation, crystallization, column chromatography, and high-performance liquid chromatography (HPLC). A yield of the dialdehyde may be at least 50%, preferably at least 60%, preferably at least 70%, preferably at least 80%, preferably at least 85%, preferably at least 90% by mole relative to a total mole of starting material 3,6-dihalocarbazole of formula (II-ii). Methods of agitating a reaction mixture include, without limitation, using an agitator, a vortexer, a rotary shaker, a magnetic stirrer, a centrifugal mixer, an overhead stirrer, an ultrasonic probe, or placing the reaction mixture in an ultrasonic bath.

The present disclosure is intended to include a mixed copolymer formed by employing more than one dialdehyde of formula (II) with different substitutions at R$_1$, R$_3$, and/or R$_4$, and/or more than one dinitrile of formula (III) with different substitutions at R$_2$ and/or R$_5$ in a polycondensation reaction. An exemplary structure of the formed mixed copolymer may be represented by formula (IV)

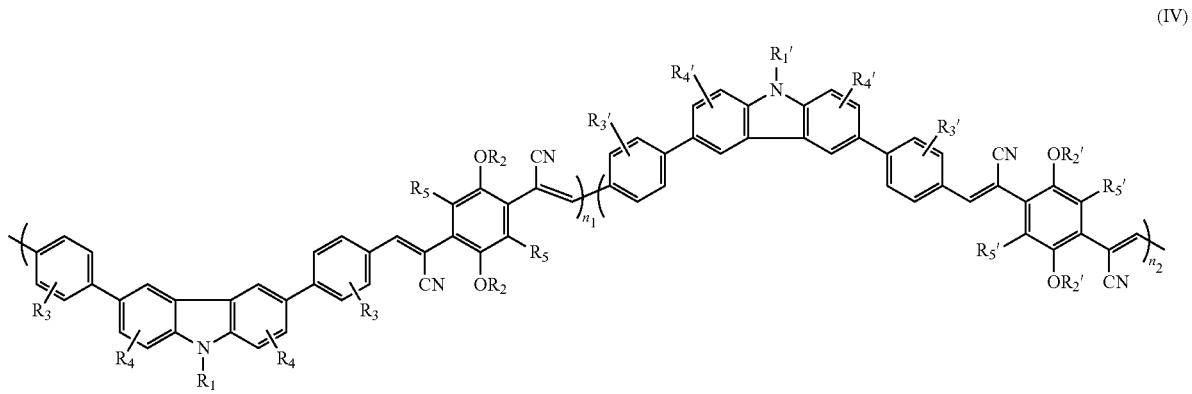

(IV)

wherein (i) R$_1$ and R$_1$' are independently selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl, (ii) each R$_2$ and R$_2$' are independently selected from the group consisting of an optionally substituted alkyl, an optionally substituted cycloalkyl, an optionally substituted arylalkyl, and an optionally substituted aryl, (iii) each R$_3$ and R$_3$' are independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (iv) each R$_4$ and R$_4$' are independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl, (v) each R$_5$ and R$_5$' are independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano, (vi) n$_1$ and n$_2$ are independently a positive integer in the range of 2-10000, and (vii) R$_1$≠R$_1$', R$_2$≠R$_2$', R$_3$≠R$_3$', R$_4$≠R$_4$', and/or $R_5 \neq R_5'$. In certain embodiments, the copolymer described herein may be formed by employing a single dialdehyde of formula (II) with the same substitutions at $R_1$, $R_3$, and $R_4$ ($R_1=R_1'$, $R_3=R_3'$, and $R_4=R_4'$) and more than one dinitrile of formula (III) with different substitutions at $R_2$ and/or $R_5$ ($R_2 \neq R_2'$, and/or $R_5 \neq R_5'$) in a polycondensation. In other embodiments, the copolymer may be formed by employing more than one dialdehyde of formula (II) with different substitutions at $R_1$, $R_3$, and/or $R_4$ ($R_1 \neq R_1'$, $R_3 \neq R_3'$, and/or $R_4 \neq R_4'$), and a single dinitrile of formula (III) with the same substitutions at $R_2$ and $R_5$ ($R_2=R_2'$, and $R_5=R_5'$) in a polycondensation. In a preferred embodiment, the copolymer is formed by a single dialdehyde of formula (II) ($R_1=R_1'$, $R_3=R_3'$, and $R_4=R_4'$) and a single dinitrile of formula (III) ($R_2=R_2'$, and $R_5=R_5'$).

The copolymer disclosed herein may be a block copolymer, an alternating copolymer, a periodic copolymer, a gradient copolymer, or a statistical copolymer. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively. Statistical copolymers are copolymers in which the sequence of monomer residues follows a statistical rule. That is, the probability of finding a particular monomer residue at a particular point in the chain is equal to the mole fraction of that monomer residue in the chain. The statistical copolymer may be referred to as a truly random copolymer. Periodic copolymers have the monomers arranged in a repeating sequence. In an embodiment where only one type of dinitrile is present as the first monomer, only one type of dialdehyde is present as the second monomer, and the mole ratio of the first monomer to the second monomer is about 1:1, the copolymer is an alternating copolymer with regular alternating A and B units (e.g., $(A-B)_n$), where A represents the first monomer and B represents the second monomer. In another embodiment, the copolymer may be a gradient copolymer which exhibits a gradual change in composition along the polymer chain from mostly A units to mostly B units.

A particle is defined as a small object that behaves as a whole unit with respect to its transport and properties. The copolymer of the present disclosure in any of its embodiments may be in the form of particles of the same shape or different shapes, and of the same size or different sizes. An average diameter (e.g., average particle diameter) of the particle, as used herein, refers to the average linear distance measured from one point on the particle through the center of the particle to a point directly across from it. Microparticles are particles having an average diameter between 0.1 and 100 µm in size. Nanoparticles are particles having an average diameter between 1 and 100 nm in size. In one embodiment, the copolymer described herein may be in the form of microparticles having an average diameter in a range of 0.1-100 µm, 0.5-50 µm, 1-40 µm, 2-30 µm, 3-25 µm, 4-20 µm, 5-15 µm, 6-10 µm, or 7-9 µm. In another embodiment, the copolymer may be in the form of nanoparticles having an average diameter in a range of 1-99 nm, 5-90 nm, 10-80 nm, 20-70 nm, 30-60 nm, or 40-50 nm. In a preferred embodiment, the copolymer is in the form of microparticles.

The particles (e.g. nanoparticles, microparticles) of the copolymer may be spherical, ellipsoidal, oblong, ovoidal, or some other rounded shape. In an alternative embodiment, the particles may be angular, rectangular, prismoidal, or some other angular shape. In a preferred embodiment, the particles are spherical. Microspheres are spherical microparticles. In a more preferred embodiment, the copolymer is in the form of microspheres having a diameter of 0.1-50 µm, 0.25-40 µm, 0.5-30 µm, 0.75-20 µm, 1-10 µm, 1.5-5 µm, 2-4 µm, or 2.5-3 µm. The size and shape of particles may be analyzed by techniques such as dynamic light scattering (DLS), scanning electron microscopy (SEM), transmission electron microscopy (TEM), and/or atomic force microscopy (AFM).

The Brunauer-Emmet-Teller (BET) theory (S. Brunauer, P. H. Emmett, E. Teller, *J. Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, BET surface area is measured by gas adsorption analysis, preferably $N_2$ adsorption analysis. In a preferred embodiment, the copolymer has a BET surface area of 30-120 $m^2/g$, preferably 40-110 $m^2/g$, preferably 45-100 $m^2/g$, preferably 50-95 $m^2/g$, preferably 55-90 $m^2/g$, preferably 60-85 $m^2/g$, preferably 65-80 $m^2/g$, preferably 70-75 $m^2/g$. The surface of the copolymer may be mesoporous or microporous. The term "microporous" refers to a surface having an average pore diameter of less than 2 nm (20 Å), while the term "mesoporous" refers to a surface having an average pore diameter of 2-50 (20-500 Å) nm. In one or more embodiments, the copolymer described herein in any of its embodiments has a pore size of 5-50 Å, 8-40 Å, 10-30 Å, 12-25 Å, 15-20 Å, or 17-19 Å. In a more preferred embodiment, the copolymer is microporous and has a pore size of 8-19 Å, preferably 10-18 Å, preferably 12-17 Å, preferably 13-16 Å, preferably 14-15 Å. Pore size may be determined by methods including, but not limited to, gas adsorption (e.g. $N_2$ adsorption), mercury intrusion porosimetry, and imaging techniques such as scanning electron microscopy (SEM), and x-ray computed tomography (XRCT).

As used herein, fluorescence is the emission of light by a substance that has absorbed light or other electromagnetic radiation. It is a form of luminescence. However, unlike phosphorescence, where the substance would continue to glow and emit light for some time after the radiation source has been turned off, fluorescent materials would cease to glow immediately upon removal of the excitation source. Hence, it is not a persistent phenomenon. Fluorescence occurs when an orbital electron of a molecule, atom, or nanostructure relaxes to its ground state by emitting a photon from an excited singlet state. In most cases, the emitted light has a longer wavelength, and therefore lower energy, than the absorbed radiation in a phenomenon known as the Stokes shift. Many molecules that fluoresce are conjugated systems. In a preferred embodiment, the copolymer of formula (I) in an organic solvent (e.g. THF, methylene chloride, chloroform) has a fluorescence emission peak of 450-650 nm, preferably 470-650 nm, preferably 490-630 nm, preferably 510-580 nm, preferably 515-570 nm, preferably 520-560 nm at an excitation wavelength of 370-410 nm, preferably 380-400 nm, preferably 382-398 nm, preferably 384-396 nm, preferably 386-394 nm, preferably 388-392 nm, or about 390 nm. In some embodiments, copolymer of formula (P1) has an emission peak with a longer wavelength relative to the one of copolymer of formula (P2) by at least 10 nm, 20 nm, 25 nm, 30 nm, 40 nm, or 50 nm. In some embodiments, the copolymer of formula (I) has a Stokes shift of at least about 10 nm, about 25 nm, about 50 nm, about 75 nm, about 100 nm, or about 150 nm, which is calculated based on the difference between emission and excitation peaks.

As used herein, quantum yield (Φ) refers to the fluorescence quantum yield and gives the efficiency of the fluorescence process. It is defined as the ratio of the number of photons emitted to the number of photons absorbed. The maximum fluorescence quantum yield is 1.0 (100%); wherein each photon absorbed results in a photon emitted. An alternative way to define the quantum yield of fluorescence is by the rate of excited state decay. In a preferred embodiment, the copolymer of formula (I) has a quantum yield in a range of 0.02-0.9, preferably 0.05-0.8, preferably 0.1-0.7, preferably 0.2-0.6, preferably 0.3-0.5 for its fluorescence emission peak 450-650 nm, preferably 470-650 nm, preferably 490-630 nm, preferably 510-580 nm, preferably 515-570 nm, preferably 520-560 nm at an excitation wavelength of 370-410 nm, preferably 380-400 nm, preferably 382-398 nm, preferably 384-396 nm, preferably 386-394 nm, preferably 388-392 nm, or about 390 nm. In some embodiments, copolymer of formula (P2) has a higher fluorescence quantum yield than copolymer of formula (P1) by at least 20%, 40%, 50%, 60%, or at least 70%.

As defined herein, conjugated polymers are polymers which contain mainly $sp^2$-hybridized (or also sp-hybridized) carbon atoms in the main chain, which may also be replaced by appropriate heteroatoms. In the simplest case, this means the presence of alternating double and single bonds in the main chain. Naturally occurring defects or minor impurities which lead to interruptions to the conjugation do not invalidate the term "conjugated polymers". Furthermore, a polymer in which, for example, carbazole units such as the N-substituted diphenylcarbazole of formula (I) or other such units and/or particular heterocycles (i.e. conjugation via N, O or S atoms) are present in the main chain is likewise described as conjugated in the present disclosure. On the other hand, units such as simple (thio)ether bridges, ester linkages, amide or imide linkages would be unambiguously defined as non-conjugated segments. In one or more embodiments, the copolymer disclosed herein is a conjugated polymer.

As used herein, band gap energy ($E_g$), band gap, and/or energy gap refers to an energy range in a solid where no electron states can exist. In graphs of the electronic band structure of solids, the band gap generally refers to the energy difference (in electron volts) between the top of the valence band and the bottom of the conduction band in insulators and/or semiconductors. It is generally the energy required to promote a valence electron bound to an atom to become a conduction electron, which is free to move within the crystal lattice and serve as a charge carrier to conduct electric current. Optoelectronic materials such as conjugated polymers are generally classified according to their band gap, which is closely related to the HOMO/LUMO gap in chemistry. Band gap energies for copolymers described herein may be obtained using optical spectroscopies, e.g. UV-vis spectroscopy and/or electrochemical measurements, e.g. cyclic voltammetry (CV) and differential pulse voltammetry (DPV). In one or more embodiments, the copolymer of the present disclosure in any of its embodiments has a band gap energy of 2.0-3.2 eV, 2.1-3.0 eV, 2.2-2.9 eV, 2.3-2.8 eV, 2.4-2.7 eV, or 2.5-2.6 eV. However, in some embodiments, the band gap energy may be less than 2.0 eV or greater than 3.2 eV.

According to a third aspect, the present disclosure relates to a photoelectrode, comprising a metal oxide conducting substrate, and a layer comprising the copolymer of formula (I) of the first aspect deposited over the metal oxide conducting substrate. Additionally, the layer has a thickness in a range of 5-1000 nm, 10-750 nm, 20-500 um, 40-400 nm, 60-300 nm, 80-200 nm, 100-180 nm, 120-160 nm, or 130-150 nm. In one embodiment, the copolymer of formula (I) is present in an amount of 50-99.9 wt %, preferably 55-99 wt %, preferably 60-95 wt %, preferably 65-90 wt %, preferably 70-85 wt %, preferably 75-80 wt % relative to a total weight of the layer. However, in some embodiments, the copolymer is present in an amount of less than 50 wt % or greater than 99.9 wt % relative to a total weight of the layer.

The copolymer may be deposited onto the metal oxide conducting substrate via various techniques including, without limitation, chemical vapor deposition, atomic layer deposition, chemical solution deposition by dip coating, spin coating or spraying, Langmuir-Blodgett method, sputter deposition, cathodic arc deposition, pulsed laser deposition, lithography, or thermal evaporation method. In a preferred embodiment, the layer comprising the copolymer of formula (I) is produced by chemical deposition. In a more preferred embodiment, the dip coating method is employed by dipping a substrate in a solution of the copolymer in an organic solvent (e.g. THF, methylene chloride, chloroform, acetone, acetonitrile) at a concentration of 0.1-100 g/L, 1-50 g/L, 2-25 g/L, 3-20 g/L, 4-15 g/L, or 5-10 g/L for 5-120 min, 10-60 min, or 15-45 min to prepare an initial photoelectrode. The initial photoelectrode may be removed from the solution and dried in air, or in an oven, or over a hot plate at a temperature of 40-120° C., 50-110° C., 60-100° C., or 70-90° C. for 0.25-6 hours, 0.5-4 hours, or 1-3 hours to produce the photoelectrode. In an alternative embodiment, the photoelectrode of the third aspect may be formed by lithography, preferably nanolithography. Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the photoelectrode may be synthesized by two or more techniques, for instance, a chemical solution deposition method and then a nanolithography etching method to form a nanostructure having an increased surface area and/or appropriate patterns for photoelectrocatalysis.

In some embodiments, additional polymers may be present in the layer to disperse the copolymer of formula (I) in solid state and add physical strength and durability and portability to the photoelectrode. Additional polymers suitable for the purpose of present disclosure include, but are not limited to, polyvinyl chloride (PVC), polystyrene (PS), polyethylene (PE), and poly(methyl methacrylate) (PMMA). It is equally envisaged that the photoelectrode described herein may be adapted to incorporate additional polymers such as polyurethane, polyethylene terephthalate, polyester, polyvinylidene chloride, polypropylene (PP), polyamides, nylons, polysulfones, fluoropolymers (e.g., polyvinylidene fluoride (PVDF), polytetrafluoroethylene (PTFE)), silicones (e.g., polydimethylsiloxane (PDMS) and polymethylphenylsilicone (PMPS)), acrylonitrile butadiene styrene (ABS), polyethylene/acrylonitrile butadiene styrene (PE/ABS), polycarbonate (PC), and polycarbonate/acrylonitrile butadiene styrene (PC/ABS). In one embodiment, where an additional polymer is introduced, the photoelectrode may be prepared by dipping a substrate into a mixture of the aforementioned polymer, the copolymer of formula (I) of the present disclosure, and an optional solvent. A solvent may be optionally used to help dissolve the additional polymers and copolymer to form a homogeneous solution, thus disperse the copolymer with the additional polymer(s). The solvent is chosen primarily for its ability to completely dissolve the polymers and the copolymer and for the ease of solvent removal in the photoelectrode formation steps. Preferred solvents include dichloromethane, chloroform, acetone, tetrahydrofuran, acetonitrile, diethyl ether, ethyl acetate, pentane, hexanes, dioxanes, methanol, ethanol, and mixtures thereof. A total amount of the additional polymer and the copolymer of the present disclosure may be in a range of 5-50 wt %, 10-40 wt %, or 20-30 wt % relative to a weight of the solution for dip coating. A weight ratio of the additional polymer relative to the copolymer of formula (I) may be in a range of 1:100, 1:80, 1:60, 1:50, 1:40, 1:30, 1:20, 1:10, 1:5, 1:2, or 1:1.

Exemplary substrates include fluorine doped tin oxide (FTO) film, indium tin oxide (ITO) film, ITO coated polyethylene terephthalate (PET) film, a gold film, gold coated glass, aluminum oxide, titanium oxide, nickel oxide, tungsten oxide, strontium titanate, quartz, and silicon wafer. In a preferred embodiment, a metal oxide conducting substrate is used. In a more preferred embodiment, the metal oxide conducting substrate used is fluorine doped tin oxide. In some embodiments, the layer comprising the copolymer and the optional additional polymer(s) deposited on the substrate has a thickness of 5-1,000 nm, 10-750 nm, 20-500 um, 40-400 nm, 60-300 nm, 80-200 nm, 100-180 nm, 120-160 nm, or 130-150 nm. In one embodiment, 70-100%, more preferably 80-99%, more preferably 85-97% of the surface of the metal oxide conducting substrate is covered with the layer comprising the copolymer of formula (I), though in some embodiments, less than 70% of the surface of the metal oxide conducting substrate is covered with the layer comprising the copolymer.

As used herein, UV-vis spectroscopy or UV-vis spectrophotometry refers to absorption spectroscopy or reflectance spectroscopy in the ultraviolet-visible spectral region. This means it uses light in the visible and adjacent (near-UV and near-infrared) ranges. The absorption or reflectance in the visible range directly affects the perceived color of the chemicals involved. In this region of the electromagnetic spectrum, molecules undergo electronic transitions. Molecules containing π-electrons or non-bonding electrons (n-electrons) can absorb the energy in the form of ultraviolet or visible light to excite these electrons to higher antibonding molecular orbitals. The more easily excited the electrons (i.e. the lower the energy gap between the HOMO and the LUMO), the longer the wavelength of light it can absorb. This technique is complementary to fluorescence spectroscopy, in that fluorescence deals with transitions from the excited state to the ground state, while absorption measures transitions from the ground state to the excited state. In one or more embodiments, the photoelectrode described herein has an ultraviolet visible absorption with an onset absorption edge in a range of 400-600 nm, preferably 420-580 nm, preferably 440-560 nm, preferably 450-550 nm, preferably 465-520 nm, preferably 470-500 nm. In some embodiments, copolymer of formula (P1) has an onset absorption edge at a longer wavelength relative to one of copolymer of formula (P2) by at least 10 nm, 15 nm, 20 nm, 23 nm, 30 nm, 40 nm, or at least 50 nm.

According to a fourth aspect, the present disclosure relates to a photoelectrochemical cell, including the photoelectrode of the third aspect, a counter electrode, and an electrolyte solution comprising water and an inorganic salt in contact with both electrodes. As used herein, the photoelectrode may be considered as the working electrode in the photoelectrochemical cell.

In one embodiment, the photoelectrochemical cell is a vessel having an internal cavity for holding the electrolyte solution. The vessel may be cylindrical, cuboid, frustoconical, spherical, or some other shape. The vessel walls may comprise a material including, but not limited to, glass, quartz, polypropylene, polyvinyl chloride, polyethylene, and/or polytetrafluoroethylene. In a preferred embodiment, a vessel with a transparent window is used. For example, the window may comprise glass or quartz, though in one embodiment, a polymeric material transparent to visible light and chemically stable with the reaction mixture may be used. As defined herein, "transparent" refers to an optical quality of a compound wherein a certain wavelength or range of wavelengths of light may traverse through a portion of the compound with a small loss of light intensity. Here, the "transparent window" may causes a loss of less than 10%, preferably less than 5%, more preferably less than 2% of the intensity of a certain wavelength or range of wavelengths of light. In one embodiment, the vessel wall and window may comprise the same material, for example, a vessel may comprise quartz walls, which may also function as transparent windows. The internal cavity may have a volume of 2 mL-100 mL, preferably 2.5 mL-50 mL, more preferably 3 mL-20 mL. In another embodiment, the internal cavity may have a volume of 100 mL-50 L, preferably 1 L-20 L, more preferably 2 L-10 L. In another embodiment, for instance, for pilot plant testing, the internal cavity may have a volume of 50 L-10,000 L, preferably 70 L-1,000 L, more preferably 80 L-2,000 L. In another embodiment, the internal cavity may have a volume larger than 2,000 L. In one embodiment, one or more photoelectrochemical cells may be connected to each other in parallel and/or in series. In another embodiment, the electrolyte solution may be in contact with more than one working electrode and/or more than one counter electrode.

In one embodiment, the counter electrode comprises platinum, gold, silver, or carbon. In a preferred embodiment, the counter electrode comprises platinum. In one embodiment, the counter electrode may be in the form of a wire, a rod, a cylinder, a tube, a scroll, a sheet, a piece of foil, a woven mesh, a perforated sheet, or a brush. The counter electrode may be polished in order to reduce surface roughness or may be texturized with grooves, channels, divots, microstructures, or nanostructures. In at least one embodiment, where the counter electrode comprises platinum, the counter electrode is in the form of a wire. In some embodiments, the counter electrode may comprise some other electrically-conductive material such as gold, platinum-iridium alloy, iridium, titanium, titanium alloy, stainless steel, and cobalt alloy. As defined herein, an "electrically-conductive material" is a substance with an electrical resistivity of at most $10^{-6}$ Ω·m, preferably at most $10^{-7}$ Ω·m, more preferably at most $10^{-8}$ Ω·m at a temperature of 20-25° C. In a preferred embodiment, the counter electrode has at least one outer surface comprising an essentially inert, electrically conducting material, such as platinum, gold, silver, or carbon. In another preferred embodiment, the counter electrode may comprise solid platinum, gold, or carbon. The material of the counter electrode should be sufficiently inert to withstand the chemical conditions in the electrolyte solution without substantially degrading during the photoelectrochemical reaction.

In one embodiment, the electrolyte solution comprises water and an inorganic salt. The water may be tap water, distilled water, bidistilled water, deionized water, deionized distilled water, reverse osmosis water, and/or some other water. In one embodiment, the water is bidistilled to eliminate trace metals. Preferably the water is bidistilled, deionized, deionized distilled, or reverse osmosis water and at 25° C. has a conductivity at less than 10 μS·cm$^{-1}$, preferably less than 1 μS·cm$^{-1}$, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, the electrolyte solution has an inorganic salt concentration of 0.05-1 M, preferably 0.1-0.8 M, preferably 0.2-0.7 M, preferably 0.4-0.6 M, or about 0.5 M, though in some embodiments, the inorganic salt may be present at a concentration less than 0.05 M or greater than 1 M. The inorganic salt may be $Na_2SO_4$, $K_2SO_4$, $ZnSO_4$, LiCl, NaCl, KCl, $NaClO_4$, $KNO_3$, $NaNO_3$, $NH_4Cl$, $NH_4NO_3$, $LiPF_6$, $MgCl_2$, or some other inorganic salt. Preferably the inorganic salt is $Na_2SO_4$. In an alternative embodiment, an inorganic acid such as HCl, $HClO_4$, $HNO_3$, or $H_2SO_4$ may be used in addition to, or in lieu of the inorganic salt. In another alternative embodiment, an inorganic base such as LiOH, NaOH, KOH, or $NH_3$ may be may be used in addition to, or in lieu of the inorganic salt. In one or more embodiments, the electrolyte solution has a pH in a range of 5-9, preferably 6-8, more preferably a pH at about 7. In an alternative embodiment, the electrolyte solution has a pH less than 5 or greater than 9.

In one or more embodiments, the photoelectrode has a photo-current density in a range of 0.1-1.0 μA/cm$^2$, preferably 0.15-0.8 μA/cm$^2$, preferably 0.2-0.5 μA/cm$^2$, preferably 0.25-0.4 μA/cm$^2$, preferably 0.27-0.35 μA/cm$^2$, preferably 0.29-0.33 μA/cm$^2$, preferably 0.3-0.31 μA/cm$^2$ when the electrodes are subjected to a potential of 0.1 to 0.75 V, preferably 0.25 to 0.7 V, more preferably 0.5 to 0.65 V, or about 0.6 V under visible light irradiation. In some embodiments, the photoelectrode has a photo-current density greater than 1.0 μA/cm$^2$ when subjected to a potential greater than 0.75 V under visible light irradiation. In one or more embodiments, the photoelectrode has a photo-current density in a range of 0.01-1.0 mA/cm$^2$, preferably 0.05-0.75 mA/cm$^2$, preferably 0.1-0.5 mA/cm$^2$, preferably 0.15-0.4 mA/cm$^2$, preferably 0.2-0.3 mA/cm$^2$, when the electrodes are subjected to a potential of 0.8 to 2.5 V, preferably 0.9 to 2.0 V, preferably 1.0 to 1.5 V, more preferably 1.2 to 1.4 V under visible light irradiation. In some embodiments, the photoelectrode has a photo-current density less than 0.01 mA/cm$^2$ when subjected to a potential less than 0.8 V under visible light irradiation. In an alternative embodiment, the photoelectrode has a photo-current density of 0.001-0.05 μA/cm$^2$, preferably 0.005-0.04 μA/cm$^2$, preferably 0.01-0.03 μA/cm$^2$, preferably 0.02-0.025 μA/cm$^2$ when the electrodes are subjected to a potential of 0.1 to 0.75 V, preferably 0.25 to 0.7 V, more preferably 0.5 to 0.65 V, or about 0.6 V under dark (without irradiation). In some embodiments, the photo-current density of the photoelectrode under dark is at least 20% less, at least 40% less, at least 50% less, at least 60% less, at least 70% less, at least 80% less, at least 90% less, or at least 97% less than the one of the photoelectrode under visible light irradiation.

In certain embodiments, visible light irradiation may be performed by a light source internal or external to the photoelectrochemical cell and may provide the photon energy necessary to activate the copolymer of the present disclosure in any of their embodiments as a photoelectrocatalyst. The light source may be any known light source including, but not limited to, natural solar sunlight, simulated solar light, UV light, laser light, incandescent light, and the like. Exemplary light sources include, but are not limited to, a xenon lamp such as a xenon arc lamp and a xenon flash lamp, a mercurial lamp, a metal halide lamp, an LED lamp, a solar simulator, and a halogen lamp. In certain embodiments, two or more light sources may be used. In a preferred embodiment, a simulated solar light may be used as the light source. In another preferred embodiment, natural sunlight may be used as the light source. The light may be visible light having a wavelength of 400-800 nm, preferably 420-700 nm, more preferably 450-600 nm. The light source may comprise one or more wavelengths within the range of 400-800 nm. Preferably a light source is used which emits a broad wavelength range of light and which comprises a portion or the entire visible light spectrum. A light source may additionally emit light of wavelengths below 400 nm and/or above 800 nm. In one embodiment, a filter may be used to prevent UV light from entering the reaction mixture, for example, a filter that blocks light with wavelengths less than 420 nm may be used with a simulated solar light, xenon, or a mercury gas discharge lamp. Alternatively, a light source may be used which only emits light within the visible spectrum. In an alternative embodiment, the photoelectrode may be irradiated with UV light, with or without visible light. The light source may emit a total power of 50-2000 W, preferably 100-1500 W, more preferably 500-1000 W, and may be positioned 2-30 cm, preferably 5-20 cm, more preferably 8-15 cm from the closest surface of the photoelectrode. In a preferred embodiment, the light source has an intensity of 500-4000 W/m$^2$, preferably 700-2000 W/m$^2$, more preferably 900-1500 W/m$^2$, or about 1000 W/m$^2$.

Preferably, to maintain uniform concentrations and/or temperatures of the electrolyte solution, the electrolyte solution may be agitated during the step of the subjecting. The agitating may be done intermittently or continuously. Methods of agitation include, but are not limited to, using an agitator, a stirring rod, a vortexer, a rotary shaker, a magnetic stirrer, an overhead stirrer, an ultrasonic probe, a pump, and a gas bubbler.

In one embodiment, the photoelectrochemical cell further comprises a reference electrode in contact with the electrolyte solution. A reference electrode is an electrode which has a stable and well-defined electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a saturated calomel electrode (SCE), a standard hydrogen electrode (SHE), a normal hydrogen electrode (NHE), a reversible hydrogen electrode (RHE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, or some other type of electrode. In a preferred embodiment, a reference electrode is present and is a saturated calomel electrode (SCE). However, in some embodiments, the photoelectrochemical cell does not comprise a reference electrode.

In one or more embodiments, the photo-current density decreases by less than 30%, preferably less than 25%, preferably less than 20%, preferably less than 15%, preferably less than 10%, preferably less than 8%, preferably less than 5%, preferably less than 4%, preferably less than 3%, preferably less than 2%, preferably less than 1% after subjecting the electrodes to a potential of 0.1 to 0.75 V, preferably 0.25 to 0.7 V, more preferably 0.5 to 0.65 V, or about 0.6 V under visible light irradiation for about 2-9 hours, about 3-8 hours, about 4-7 hours, or about 5 hours, relative to that measured immediately after the subjecting commences.

According to a fifth aspect, the present disclosure relates to a method of splitting water into hydrogen gas and oxygen gas. The method involves subjecting the electrodes of the photoelectrochemical cell of the fourth aspect to a potential of 0.1-2.5 V, preferably 0.25-2.0 V, preferably 0.4-1.5 V, preferably 0.6-1.25 V, preferably 0.8-1.0 V, and concurrently irradiating the photoelectrochemical cell with visible light, thereby forming hydrogen gas and oxygen gas. Here, "the electrodes" refers to the photoelectrode comprising the copolymer and the counter electrode. In some embodiments, the electrodes are subjected to a potential less than 0.1 V or greater than 2.5 V.

Photoelectrochemical water splitting dissociates water into its constituent parts, hydrogen ($H_2$) and oxygen ($O_2$), by applying a potential to a photoelectrochemical cell (PEC) under either artificial or natural light. The process generally involve the photoelectrocatalyst absorbing a photon with sufficient energy (above 1.23 eV, $\lambda < \sim 1000$ nm), subsequently permitting photoexcited electrons and holes to separate and migrate to the surface of the photoelectrocatalyst material, reducing adsorbed species (i.e. water). Two types of photochemical systems operate via photocatalysis. One uses semiconductor surfaces as catalysts. In these devices the semiconductor surface absorbs solar energy and acts as an electrode for water splitting. The other methodology uses in-solution metal complexes as catalysts.

In one embodiment, the visible light may have a wavelength of 400-800 nm, preferably 420-700 nm, more preferably 450-600 nm. Irradiating the photoelectrochemical cell with visible light during water splitting may be performed by the aforementioned light source internal or external to the photoelectrochemical cell. The light source may comprise one or more wavelengths within the range of 400-800 nm. The light source may additionally emit light of wavelengths below 400 nm and/or above 800 nm. For example, a simulated solar light may be used as the light source. For another example, natural sunlight may be used as the light source. The light source may emit a total power of 50-2000 W, preferably 100-1500 W, more preferably 500-1000 W.

In one embodiment, the electrolyte solution of the photoelectrochemical cell during water splitting has a pH in a range of 4-10, preferably 5-9, preferably 6-8, more preferably a pH at about 7. In an alternative embodiment, the electrolyte solution has a pH less than 4 or greater than 10 during water splitting. In one embodiment, the aforementioned method of splitting water into hydrogen gas and oxygen gas involves subjecting the electrodes of the photoelectrochemical cell to a potential of 0.1-2.5 V, preferably 0.25-2.0 V, preferably 0.4-1.5 V, preferably 0.6-1.25 V, preferably 0.8-1.0 V, and concurrently irradiating the photoelectrochemical cell with visible light for 0.1-24 hours, 0.5-18 hours, 1-12 hours, 2-11 hours, 3-10 hours, 4-9 hours, 5-8 hours, or 6-7 hours.

Preferably the counter electrode functions as the photocathode, receiving a negative potential to reduce water into $H_2$ gas and $OH^-$, while the photoelectrode comprising the copolymer functions as the photoanode, receiving a positive potential to oxidize $OH^-$ into $O_2$ gas and $H_2O$. This is summarized by the following reactions:

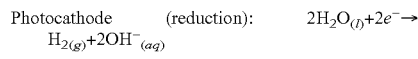

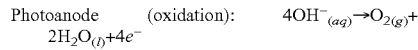

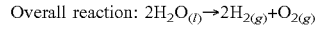

In another embodiment, the potentials may be switched, wherein the counter electrode functions as the photoanode and receives a positive potential, and the photoelectrode comprising the copolymer functions as the photocathode and receives a negative potential. In an alternative embodiment, the electrodes may be subjected to an alternating current (AC) in which the photoanode and photocathode roles are continually switched between the two electrodes.

In a preferred embodiment, the irradiating is performed at a temperature of 10-70° C., preferably 12-60° C., preferably 14-50° C., preferably 16-40° C., preferably 18-35° C., preferably 20-30° C. In one embodiment, an amount of the copolymer on the photoelectrode in the photoelectrochemical cell is in a range of 0.01-10 g/L, 0.05-9 g/L, 0.1-8 g/L, 0.2-7 g/L, 0.3-6 g/L, 0.4-5 g/L, 0.5-4 g/L, 0.6-3 g/L, 0.7-2 g/L, or 0.8-1 g/L. The hydrogen gas is produced at a rate in a range of 10-500 μmol/h per gram of the copolymer, at least 20 μmol/h per gram, at least 40 μmol/h per gram, at least 60 μmol/h per gram, at least 80 μmol/h per gram, at least 100 μmol/h per gram, up to 150 μmol/h per gram, up to 200 μmol/h per gram, up to 250 μmol/h per gram, up to 300 μmol/h per gram, up to 350 μmol/h per gram, up to 400 μmol/h per gram, up to 450 μmol/h per gram, up to 500 μmol/h per gram of the copolymer. The oxygen gas is produced at a rate in a range of 5-250 μmol/h per gram of the copolymer, at least 10 μmol/h per gram, at least 20 μmol/h per gram, at least 30 μmol/h per gram, at least 40 μmol/h per gram, at least 50 μmol/h per gram, up to 75 μmol/h per gram, up to 100 μmol/h per gram, up to 125 μmol/h per gram, up to 150 μmol/h per gram, up to 175 μmol/h per gram, up to 200 μmol/h per gram, up to 225 μmol/h per gram, up to 250 μmol/h per gram of the copolymer.

In one embodiment, the method further comprises a step of separately collecting $H_2$-enriched gas and $O_2$-enriched gas. In one embodiment, the space above each electrode may be confined to a vessel in order to receive or store the produced gases from one or both electrodes. The collected gas may be further processed, filtered, or compressed. Preferably the $H_2$-enriched gas is collected above the photocathode, and the $O_2$-enriched gas is collected above the photoanode. In one embodiment, the $H_2$-enriched gas and the $O_2$-enriched gas are not 100 vol % $H_2$ and 100 vol % $O_2$, respectively. For example, the enriched gas may also comprise $N_2$ from air, and water vapor and other dissolved gases from the electrolyte solution. The $H_2$-enriched gas may also comprise $O_2$ from air. The $H_2$-enriched gas may comprise greater than 20 vol % $H_2$, preferably greater than 40 vol %

$H_2$, more preferably greater than 60 vol % $H_2$, even more preferably greater than 80 vol % $H_2$, relative to a total volume of the receptacle collecting the produced $H_2$ gas. The $O_2$-enriched gas may comprise greater than 20 vol % $O_2$, preferably greater than 40 vol % $O_2$, more preferably greater than 60 vol % $O_2$, even more preferably greater than 80 vol % $O_2$, relative to a total volume of the receptacle collecting the produced $O_2$ gas. In some embodiments, the produced gases may be bubbled into a vessel comprising water or some other liquid, and a higher concentration of $H_2$ or $O_2$ may be collected. In one embodiment, produced $O_2$ and $H_2$, or $H_2$-enriched gas and $O_2$-enriched gas may be collected in the same vessel.

In an alternative embodiment, the photoelectrode may be used as a photocatalyst for hydrogen gas and oxygen gas production reactions under light or dark. In another alternative embodiment, the copolymer described herein may be used alone as a photocatalyst for hydrogen gas production reactions under light or dark. In some embodiments, the copolymer may be used in the field of batteries, fuel cell electrodes, organic semiconductor in optical devices, organic photovoltaics (OPV), organic field effect transistors (OFET), liquid crystal display (LCD), and/or organic light emitting diodes (OLEDs).

The examples below are intended to further illustrate protocols for preparing, characterizing the copolymer, photoelectrode and photoelectrochemical cell, and uses thereof, and are not intended to limit the scope of the claims.

Example 1

Synthesis of Polymer P1

Diacetonitrile 5 (0.418 g, 0.79 mmol) was added to a THF (17 mL) solution of dialdehyde 4 (0.300 g, 0.79 mmol) and t-BuOH (17 mL), which was followed by the addition of t-BuOK (0.260 g, 2.37 mmol) at room temperature (FIG. 1). The reaction mixture was then heated at 70° C. for 12 hours. After cooling to room temperature, the mixture was poured over ice cold methanol and acidified with acetic acid (1 mL). The resultant precipitates were filtered and crystallized from methanol to get the title copolymer P1 as a dark red amorphous solid (0.20 g, 65%). $^1$H-NMR (500 MHz, $CDCl_3$): δ 0.89-0.96 (br. m, 18H), 1.33-1.76 (br. m, 25H), 2.13 (br. s, 1H), 3.83 (br. s, 4H), 4.23 (br. s, 2H), 7.49 (br. s, 6H), 7.56-7.83 (br. m, 8H), 7.99 (br. s, 1H), 8.44 (br. s, 2H).

Example 2

Synthesis of Polymer P2

Following the same procedure adopted for the synthesis of P1, P2 was synthesized from the reaction of monomers 4 and 6 (FIG. 1) and collected as a red solid (0.24 g, 55%). $^1$H-NMR (500 MHz, $CDCl_3$): δ 0.87-0.94 (br. m, 12H), 1.41-1.25 (br. m, 44H), 1.79 (br. s, 4H), 2.11 (br. s, 1H), 3.95 (br. s, 4H), 4.22 (br. s, 2H), 7.46 (br. s, 6H), 7.55-7.85 (br. m, 8H), 8.00 (br. s, 1H), 8.42 (br. s, 2H).

Example 3

Synthesis and Characterization

Figure 11A:
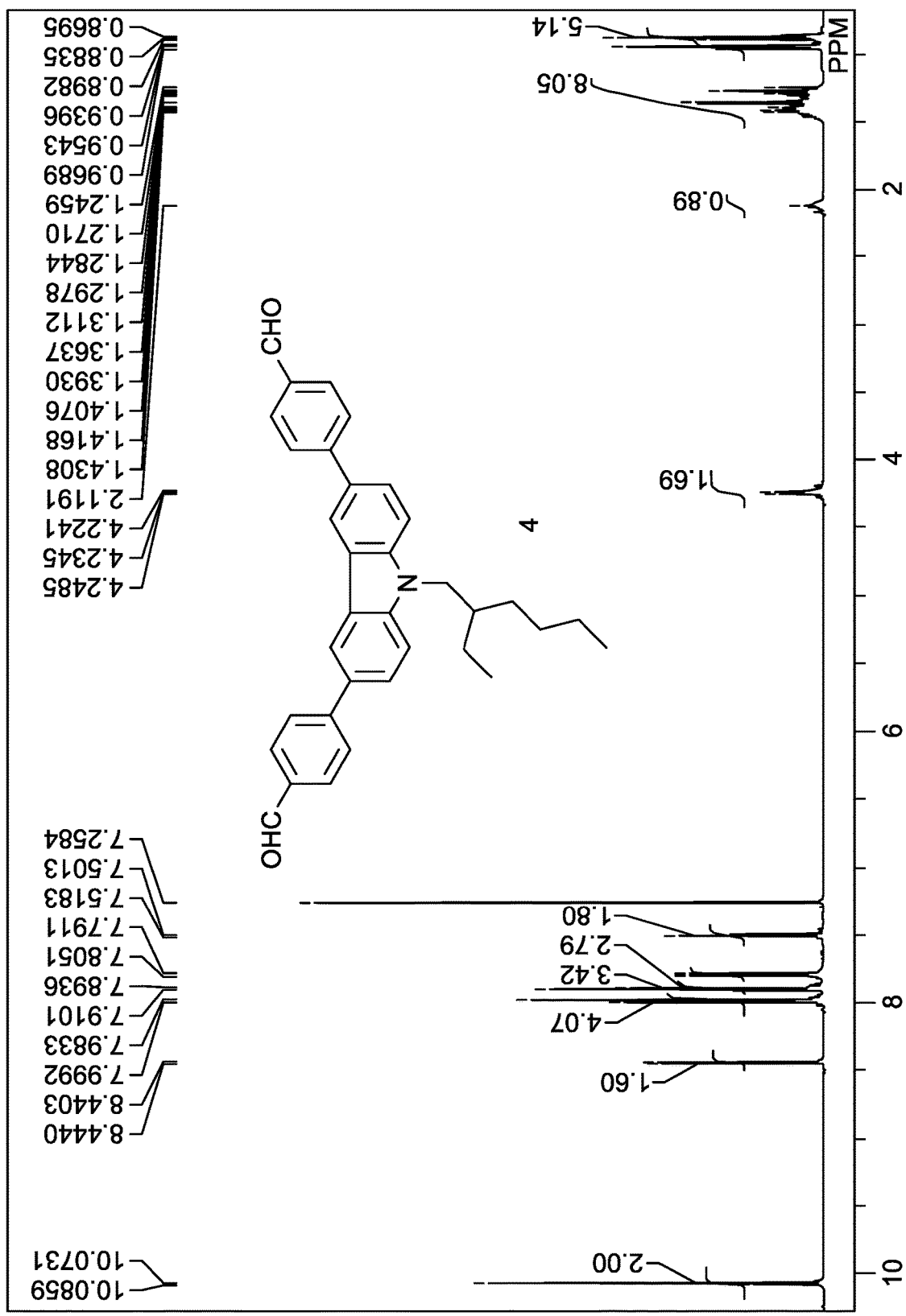
FIG. 11A is a proton nuclear magnetic resonance ($^1$H NMR) spectrum of dialdehyde monomer 4.
Figure 11B:
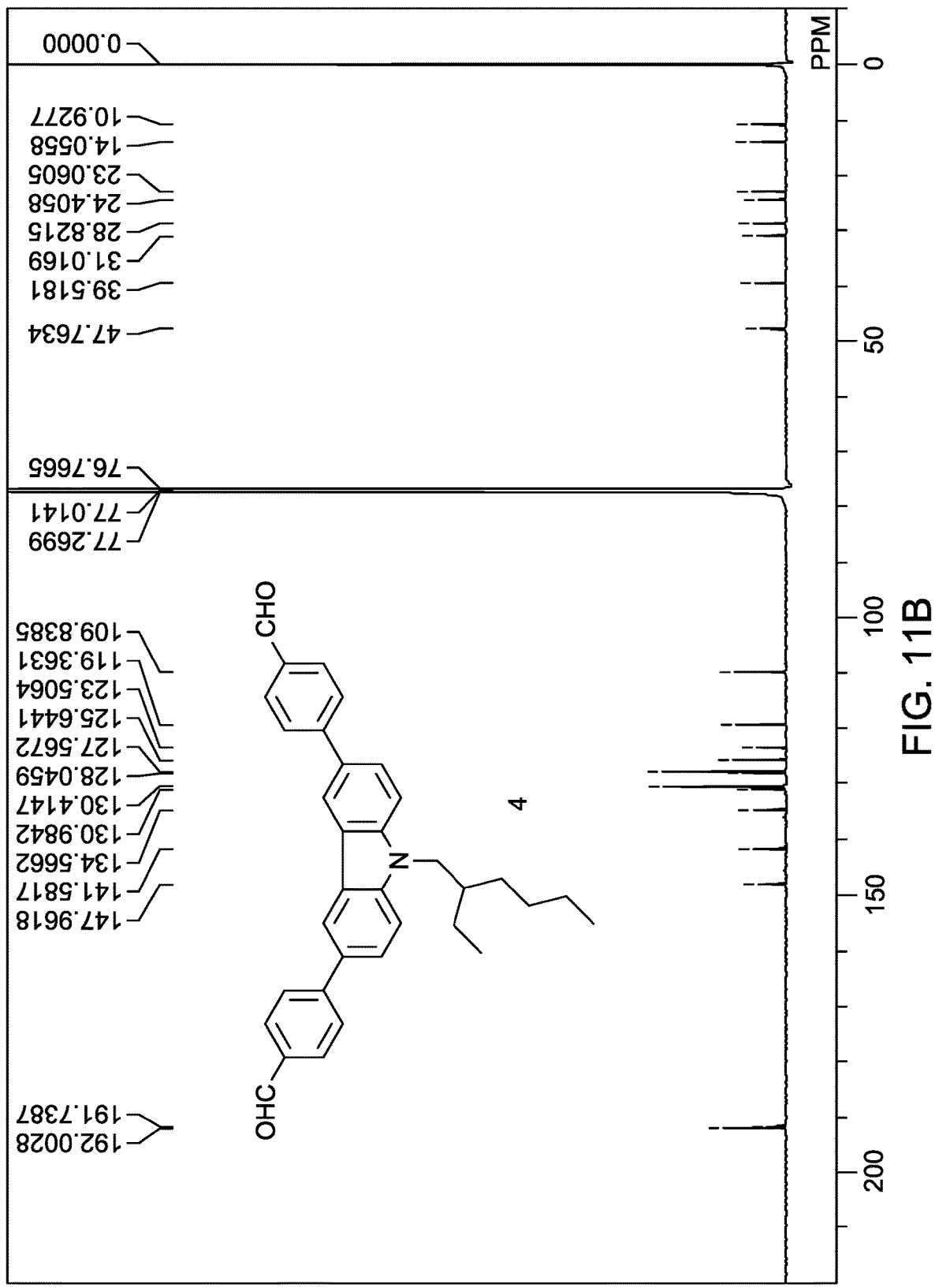
FIG. 11B is a carbon nuclear magnetic resonance ($^{13}$C NMR) spectrum of dialdehyde monomer 4.
Figure 12:
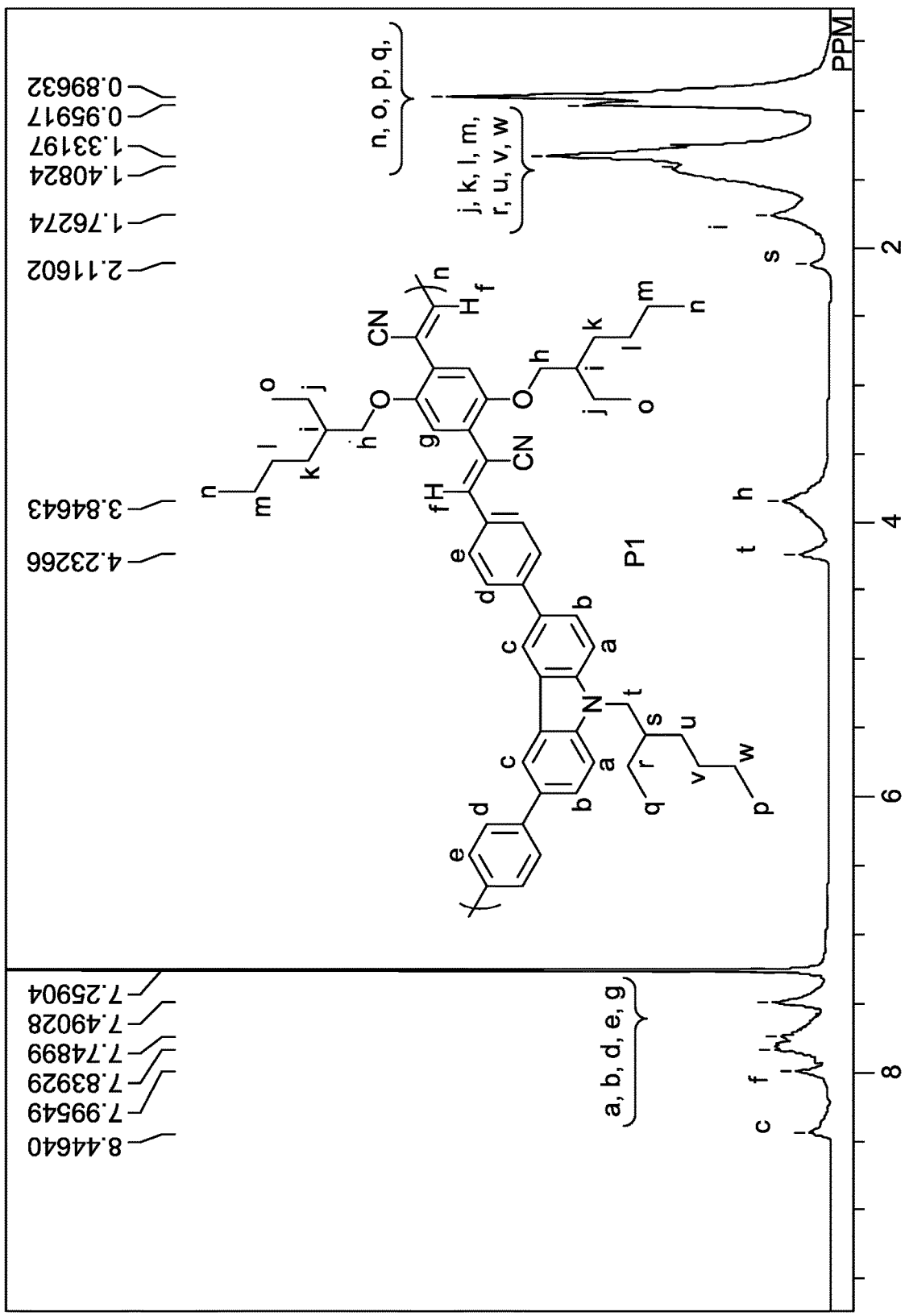
FIG. 12 is a $^1$H NMR spectrum with peak assignment of copolymer P1.
Figure 13:
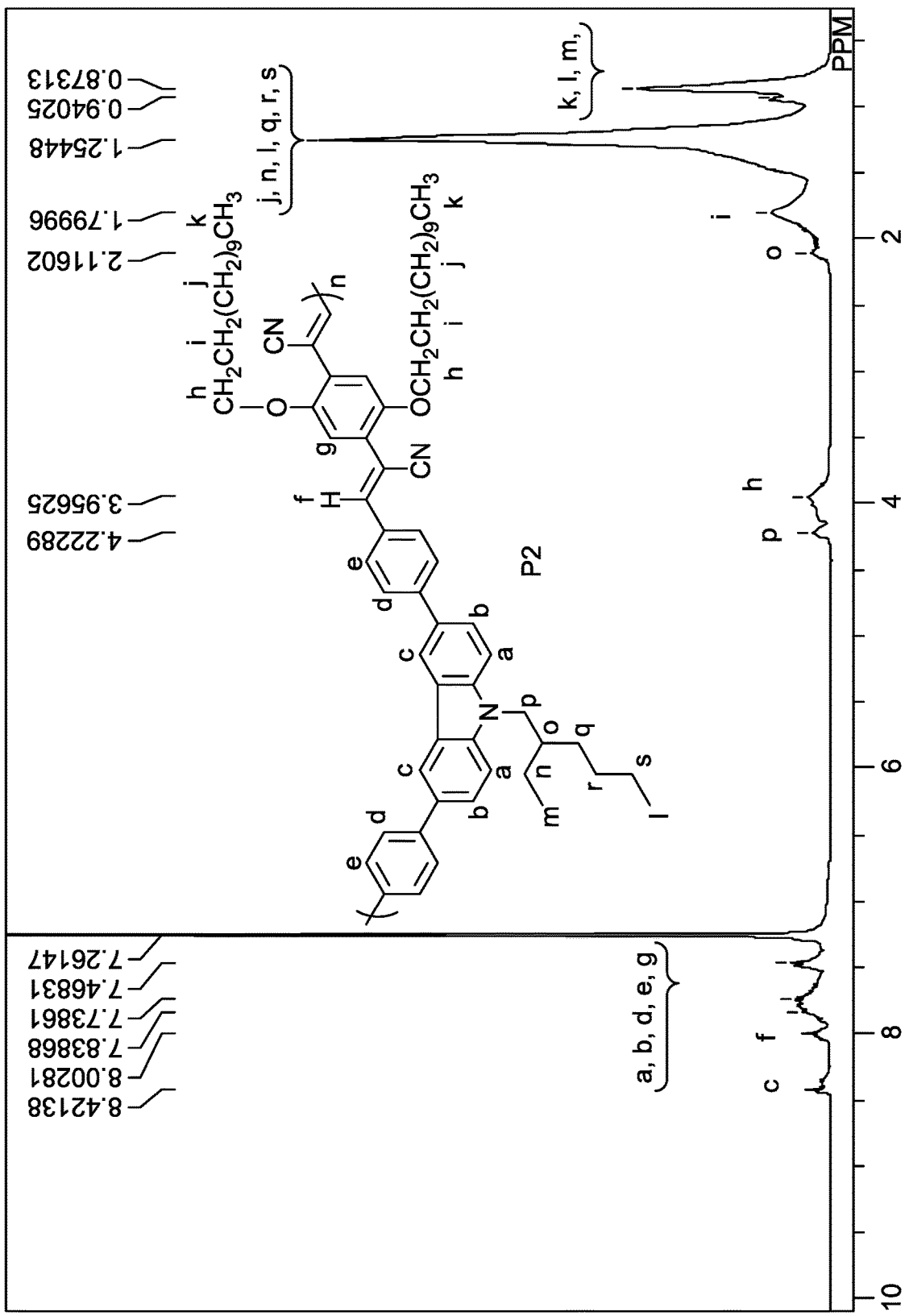
FIG. 13 is a $^1$H NMR spectrum with peak assignment of copolymer P2.

The synthesis of P1 and P2 required the synthesis of dialdehyde monomer 4 and dinitrile monomers 5 and 6, which were prepared as outlined in FIG. 1. The N-alkyaltion of carbazole 1 with 2-ethyl hexylbromide produced carbazole 2 [Kim J, Kim S H, Kim J, Kim I, Jin Y, Kim J H, et al. Di-aryl substituted poly(cyclopenta[def]phenanthrene) derivatives containing carbazole and triphenylamine units in the main chain for organic light-emitting diodes. Macromol Res 2011; 19:589-98, incorporated herein by reference in its entirety], which was then reacted with boronic ester 3 under Suzuki-Miyaura conditions to generate 4 in a yield of 80% (FIGS. 11A & B). On the other hand, the synthesis of dinitriles 5 and 6 was achieved using corresponding O-alkylated hydroquinones by adopting reported procedures [Egbe D A M, Ulbricht C, Orgis T, Carbonnier B, Kietzke T, Peip M, Metzner M, Gericke, M, Birckner F, Pakula T, Neher D, Grummt U-W. Odd-Even Effects and the Influence of Length and Specific Positioning of Alkoxy Side Chains on the Optical Properties of PPE-PPV Polymers. Chem Mater 2005; 17:6022-32; Zhu X, Traub M C, Vanden Bout D A, Plunkett K N. Well-Defined Alternating Copolymers of Oligo(phenylenevinylene)s and Flexible Chains. Macromolecules 2012; 45:5051-7; and Thompson B C, Kim Y-G, McCarley T D, Reynolds J R. Soluble Narrow Band Gap and Blue Propylenedioxythiophene-Cyanovinylene Polymers as Multifunctional Materials for Photovoltaic and Electrochromic Applications. J. Am. Chem. Soc., 2006, 128 (39), pp 12714-12725, each incorporated herein by reference in their entirety] (FIG. 1). The polymerization reaction was accomplished by Knoevenagel condensation between the dialdehyde 4 and aromatic dinitriles 5 or 6 in a 1:1 mixture t-BuOH/THF with addition of 1.5 equiv of t-BuOK per cyano group of monomers 5 or 6 (FIG. 1) [Sotzing G A, Thomas C A, Reynolds J R, Steel P J. Low Band Gap Cyanovinylene Polymers Based on Ethylenedioxythiophene. Macromolecules 1998; 31:3750-2, incorporated herein by reference in its entirety]. After the work up, the precipitated polymer was dissolved in chloroform and re-precipitated in methanol to yield P1 and P2 as red amorphous solids (FIGS. 12 and 13). These copolymers were soluble in common organic solvents including chloroform, methylene chloride and tetrahydrofuran. The characterization of both copolymers was conducted using $^1$H-NMR and FT-IR spectroscopies. The absence of aldehyde peaks of monomer 4 at 2866, 2733 and 1690 $cm^{-1}$ and shifting of residual nitrile stretching bands at ~2250 to ~2211 $cm^{-1}$ of monomers 5 or 6 in the IR spectra of copolymers indicated the presence of conjugated cyanovinylene linkages.

The $^1$H-NMR spectra of P1 in $CDCl_3$ showed broad downfield peaks assigned to protons of carbazole ring (4, 5-positions) and cyano-vinylene at δ 8.44 and 7.99 ppm, respectively. In addition, resonances at δ 4.23 and 3.84 ppm were assigned to —$NCH_2$— and —$OCH_2$— groups, respectively. Peaks for —$OCH_2CH$— (δ 1.76), —$NCH_2CH$—(δ 2.13), and terminal methyl groups of N-alkyl side chains at δ 0.89-0.95 were also observed in the spectrum. In the similar fashion, $^1$H-NMR data were consistent with the structure of copolymer P2 (FIGS. 12 and 13).

Figure 14:
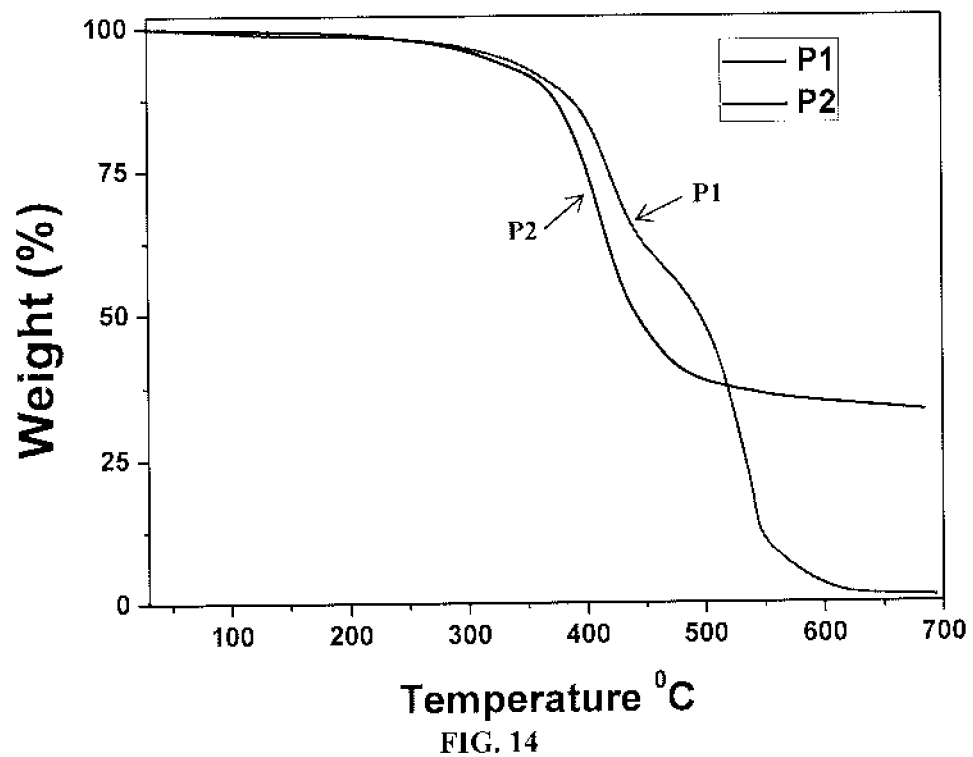
FIG. 14 is an overlay of thermal gravimetric analysis (TGA) thermograms of copolymers P1 and P2.

GPC using polystyrene as a standard and THF as the mobile phase was used to determine number-average molecular weights, which are summarized in the experimental section. The thermal properties of polymers were evaluated by thermogravimetric analysis (TGA) under oxygen atmosphere at a heating rate of 10° C. $min^{-1}$. Both copolymers were stable even at high temperatures and no appreciable mass loss was observed at temperatures up to 325° C. As shown in FIG. 14, the onset decomposition temperatures ($T_d$) of these polymers were at 350° C. However, an abrupt loss of weight was observed at temperatures above $T_d$, which indicated decomposition of the copolymer backbones.

Figure 2A:
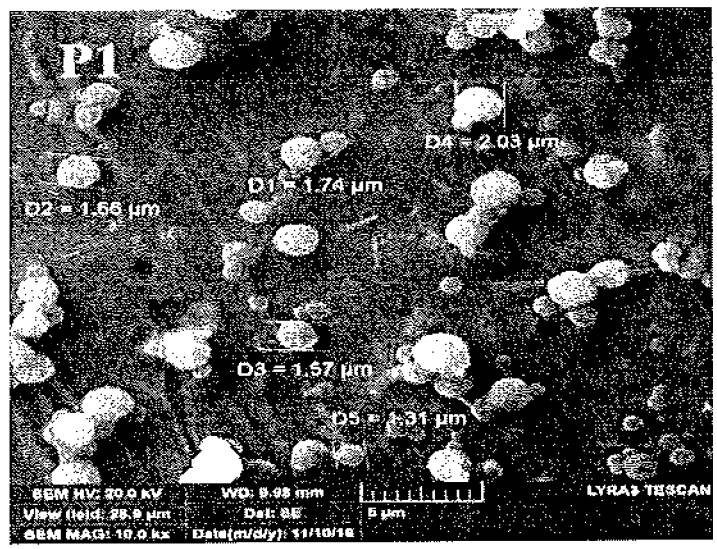
FIG. 2A is a scanning electron microscopy (SEM) image of copolymer of formula (P1).
Figure 2B:
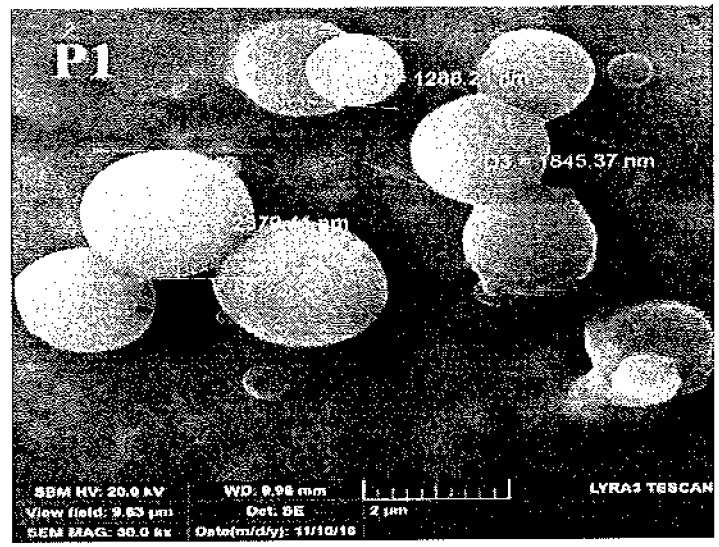
FIG. 2B is a magnified view of the sample in FIG. 2A.
Figure 3A:
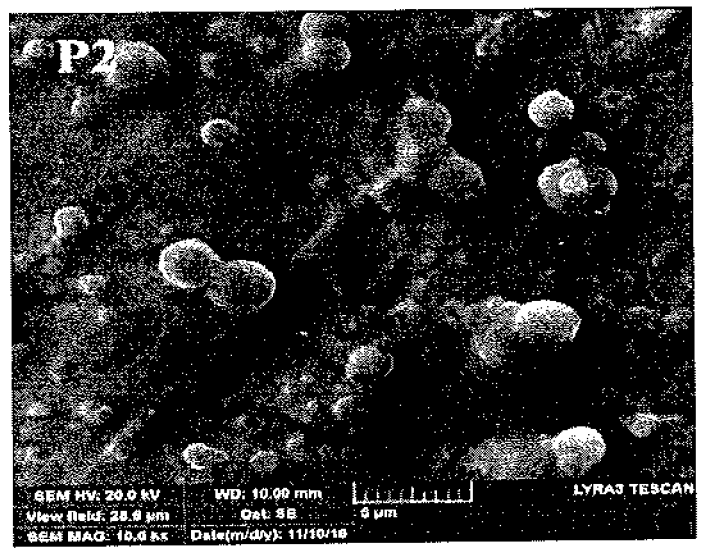
FIG. 3A is a scanning electron microscopy (SEM) image of copolymer of formula (P2).
Figure 3B:
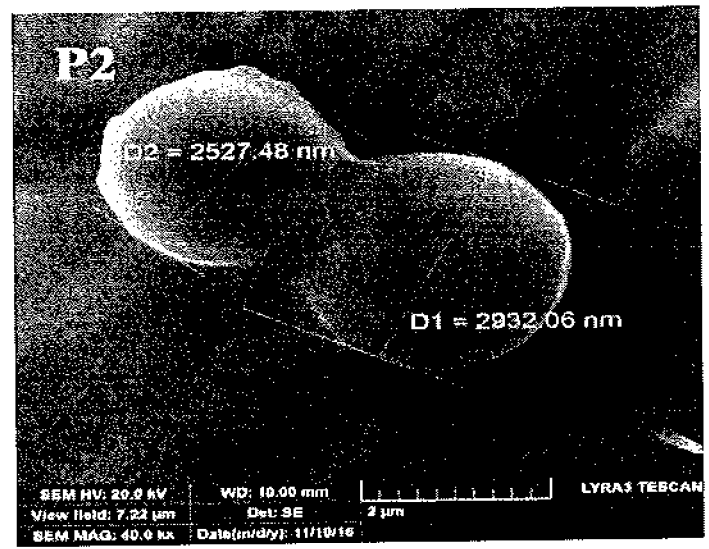
FIG. 3B is a magnified view of the sample in FIG. 3A.
Figure 15:
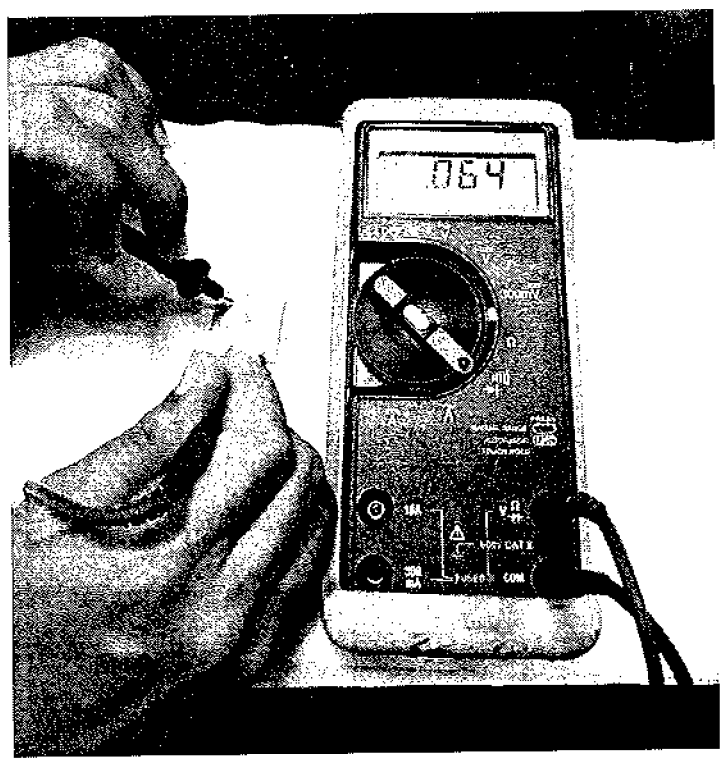
FIG. 15 is a picture of the hot probe experiment.

The surface area and pore size of copolymers were determined by a BET surface area analyzer and a porosimetry analyser, respectively. The BET surface area of P1 and P2 was found to be 83 m²/g and 64.07 m²/g, respectively. The pore size area of P1 and P2 was determined to be 16.88 Å and 12.98 Å, respectively (Table 1). The morphology of copolymers was examined by a scanning electron microscope (SEM) as shown in FIGS. 2A-B and 3A-B. The SEM images revealed that both copolymers have microspheres distributed evenly in the matrix of copolymers. These well-defined microspheres in P1 and P2 were found to have average diameters ranged between 1-1.5 and 2-3 μm, respectively. It is well known that amorphous aggregation of conjugated polymers leads to the formation of microspheres [Álvarez-Diaz A, Salinas-Castillo A, Camprubi-Robles M, Costa-Fernández J M, Pereiro R, Mallavia R, Sanz-Medel A. Conjugated polymer microspheres for "turn-off"/"turn-on" fluorescence optosensing of inorganic ions in aqueous media. Anal Chem 2011; 83:2712-8, incorporated herein by reference in its entirety]. The size of microspheres mainly depends on the average number molecular weight of a polymer ($M_n$) i.e., polymers with a higher $M_n$ have smaller microspheres [Kushida S, Braam D, Dao T D, Saito H, Shibasaki K, Ishii S, Nagao T, Saeki A, Kuwabara J, Kanbara T, Kijima M, Lorke A, Yamamoto Y. Conjugated Polymer Blend Microspheres for Efficient, Long-Range Light Energy Transfer. ACS Nano 2016; 10:5543-9, incorporated herein by reference in its entirety]. The micrographs further revealed that P1 has a larger surface area than P2 (FIGS. 2B and 3B). Moreover, the conductive type of copolymers was determined by performing a hot-probe experiment. Both hot and cold probes were wired through the positive and negative terminals, respectively of a sensitive current meter. A positive current reading was observed when the probes were applied to P1 or P2, which indicated that both copolymers were n-type (FIG. 15) [Van Zeghbroeck, B. 2011. *Principles of Semiconductor Devices*. Denver Colo.: University of Colorado, incorporated herein by reference in its entirety].

TABLE 1

BET surface analysis of copolymers P1 and P2

| Surface Area Analysis | P1 | P2 |
|---|---|---|
| Single point surface area | 0.74 m²/g | 0.56 m²/g |
| BET Surface Area | 83.30 m²/g | 64.07 m²/g |
| t-Plot Micropore Area | 78.53 m²/g | 60.41 m²/g |
| t-Plot External Surface Area | 4.76 m²/g | 3.66 m²/g |
| Pore Size (average pore width) | 16.88 Å | 12.98 Å |

Example 4

Photophysical Properties

Figure 4:
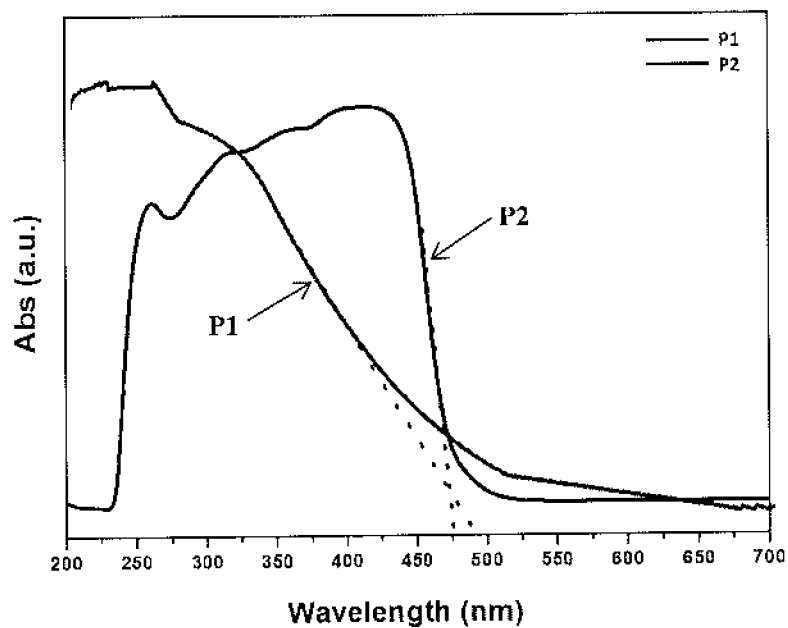
FIG. 4 is an overlay of diffuse reflectance ultraviolet-visible (DRS-UV-vis) absorption spectra of P1 and P2 copolymers deposited over fluorine doped tin oxide (FTO) substrate.

The photophysical properties and photoelectrochemical performance studies were carried out on copolymers layers deposited over a fluorine-doped tin oxide (FTO) conducting substrate, which was achieved by dip deposition technique. The FTO substrate (FTOs) was dipped in a solution of polymer dissolved in THF at concentration of 10 mg/2.5 mL for 15 minutes followed by gentle removal of electrodes from the solution and heating them at 80° C. for 1 hr. The resultant thin layers deposited over FTOs were used to study the optical properties of these polymers. The DR-UV-vis absorption and % R spectra of polymers in powder state were measured within the range of 200-800 nm (FIG. 4). The onset of absorptions from Abs vs. nm plot were applied in equation (1)

$$\text{Absorption} = hc/\lambda \qquad (1)$$

to calculate the optical bandgaps ($E_g$) of P1 and P2 as 2.51 and 2.62 eV, respectively [Iqbal N, Khan I, Yamani Z H, Qurashi A. Sonochemical assisted solvothermal synthesis of gallium oxynitride nanosheets and their solar-driven photoelectrochemical water-splitting applications. Sci Rep 2016; 6:32319, incorporated herein by reference in its entirety], where h=Planck's constant, c=speed of light and λ=onset absorption edge value. The value of hc is a constant and calculated to be 1240 eV. The calculated values of $E_g$ are given in the Table 2. It was suggested that larger dodecyloxy side chain on the phenylene ring of P2 exerted a greater influence on copolymer structure disorder and conjugation, which in turn shifted the absorption more to the blue region, resulting a higher band gap of P2 compared to P1.

Figure 5:
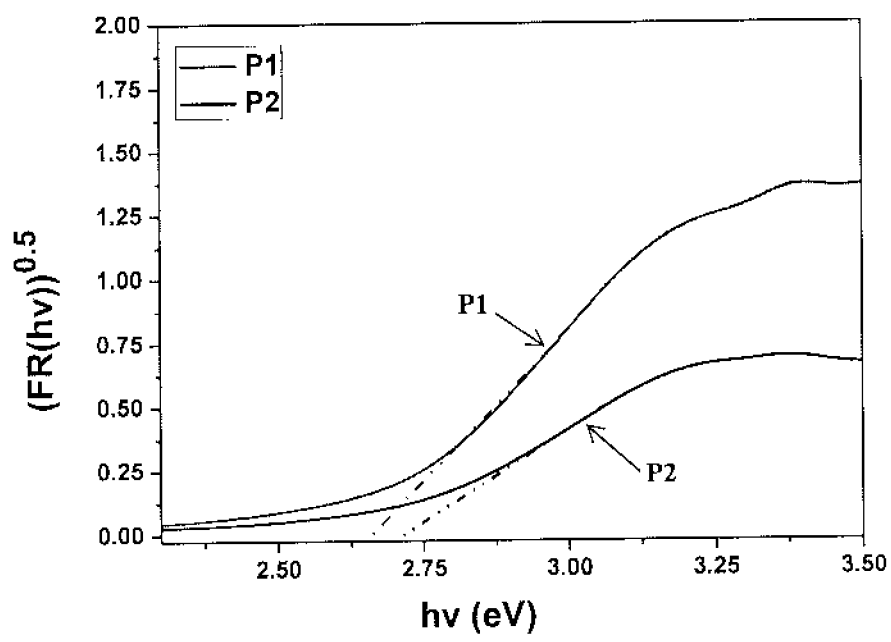
FIG. 5 is an overlay of Kubelka-Munk (KM) indirect bandgaps of P1 and P2 copolymers deposited over fluorine doped tin oxide (FTO) substrate.

Alternatively, Kubelka-Munk equation (equation 2)

$$F(R)(h\nu)^{0.5} = A(h\nu - E_g) \qquad (2)$$

can also be used to calculate $E_g$, where R is reflectance and A is a constant. By assuming the indirect transition between conductance and valence band [Moradi H, Eshaghi A, Hosseini S R, Ghani K. Fabrication of Fe-doped TiO2 nanoparticles and investigation of photocatalytic decolorization of reactive red 198 under visible light irradiation. Ultrason Sonochem 2016; 32:314-9, incorporated herein by reference in its entirety], the data from DRS/UV-Vis were used to obtain $F(R)(h\nu)^{0.5}$ versus hν curve (FIG. 5).

The $E_g$ of P1 and P2 determined by the indirect (KM) method were found to be 2.64 and 2.70 eV, respectively (Table 2).

TABLE 2

Bandgap measurements of P1 and P2 by DR-UV-vis spectrophotometry

| | Abs | KM | CV | Computational |
|---|---|---|---|---|
| $\lambda_{onset\ absorption}$ [nm] | $E_g$[eV] | $E_g$[eV] | $E_g$[eV] | Methods [eV] |
| P1 | 495 | 2.51 | 2.64 | 2.57 | 2.47 |
| P2 | 472 | 2.62 | 2.70 | 2.66 | 2.58 |

Figure 6:
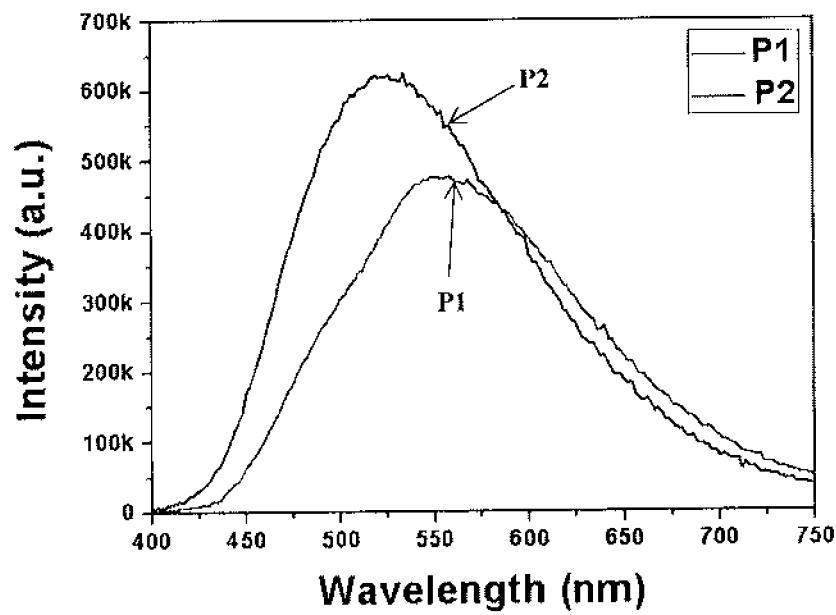
FIG. 6 is an overlay of fluorescence emission spectra of P1 and P2 copolymers in tetrahydrofuran (THF) upon excitation at 390 nm.

The photoluminescence (PL) spectroscopy was used to observe enhanced photoexcited charge separation efficiency. PL emission spectra of copolymers in THF solution (FIG. 6) demonstrated emission maxima at 554 nm and 523 nm for P1 and P2, respectively upon excitation at a wavelength of 390 nm. Additionally, the emission peak of P1 has a higher intensity than that of P2. A bathochromic shift of 31 nm and a lower emission intensity of P1 indicate a drastic quenching, which suggests the recombination of charges is effectively suppressed [Xu R, Li H, Zhang W, Yang Z, Liu G, Xu Z, Shaoa H, Qiao G. The fabrication of In₂O₃/In₂S₃/Ag nanocubes for efficient photoelectrochemical water splitting. Phys Chem Chem Phys 2016; 18:2710-7, incorporated herein by reference in its entirety].

Example 5

Computational Study

Figure 16A:
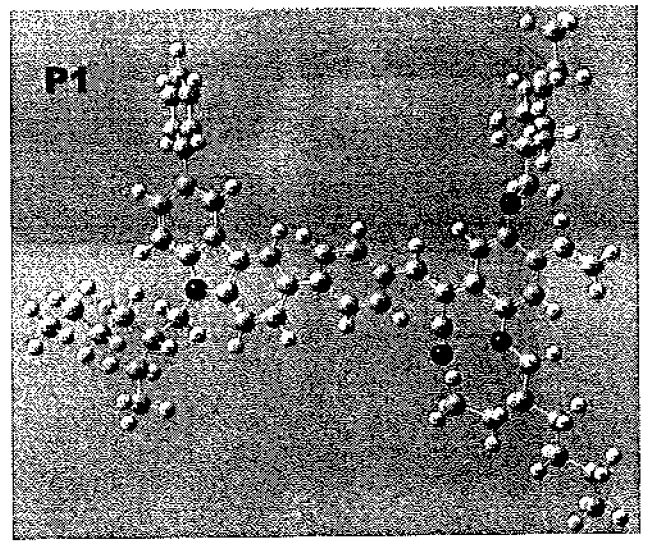
FIG. 16A shows the optimized structure of copolymer P1 repeating units.
Figure 16B:
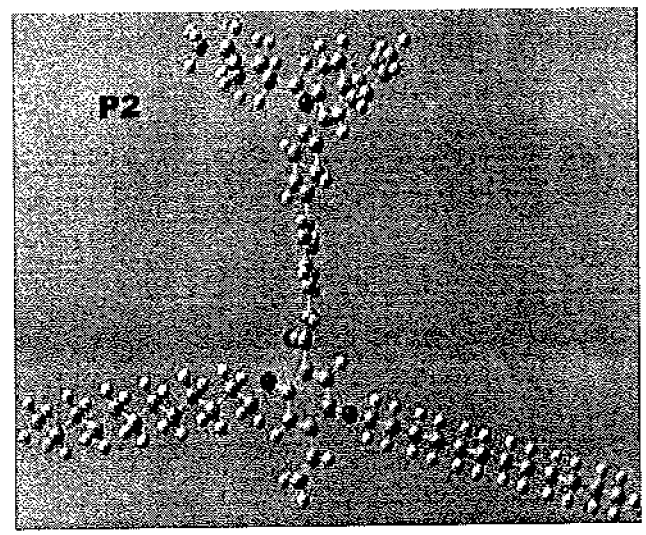
FIG. 16B shows the optimized structure of copolymer P2 repeating units.

Gauss view 5.0 and Gaussian 09 software package were used to optimize the geometries of the copolymers (FIGS. 16A and 16B) [M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M.

Caricato, X. Li, H. P. Hratchian, A. F. Izmaylov, J. Bloino, G. Zheng, J. L. Sonnenberg, M. Had and DJF. GAUSSIAN 09, Revision B.01. Gaussian, Inc, Wallingford Conn. 2010]. The optimized structures were used to calculate band gaps of P1 and P2 through density functional theory (DFT) calculations using B3LYP methods [Raghavachari K. Perspective on "Density functional thermochemistry. III. The role of exact exchange." Theor. Chem. Acc., Berlin, Heidelberg: Springer Berlin Heidelberg; 2000, p. 361-3; Lee C, Yang W, Parr R G. Development of the Colle-Salvetti correlation-energy formula into a functional of the electron density. Phys Rev B 1988; 37:785-9; and Shafiee A, Muhamad M S and M Y. Determination of HOMO and LUMO of [6,6]-Phenyl C61-butyric Acid 3-ethylthiophene Ester and Poly (3-octyl-thiophene-2,5-diyl) through Voltametry Characterization. Sains Malaysiana 2011; 40:173-176, each incorporated herein by reference in their entirety]. The calculated band gaps by computational methods for P1 and P2 were 2.47 and 2.58 eV, respectively, which were comparable to the experimental values determined by cyclic voltammetry (CV) and DR-UV-vis methods (Table 2).

Figure 17A:
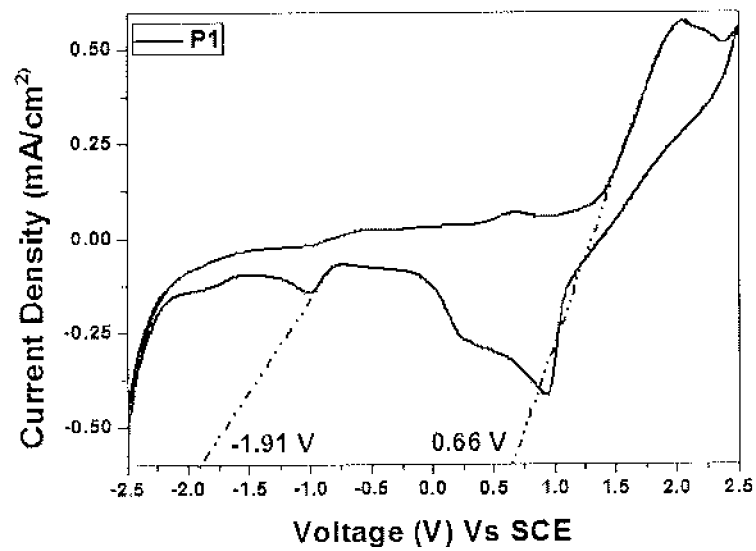
FIG. 17A is a cyclic voltammogram of copolymer P1.
Figure 17B:
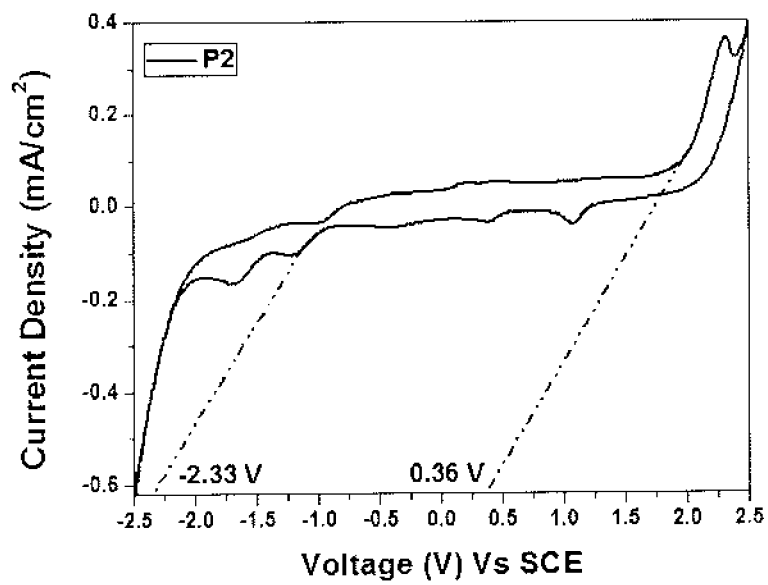
FIG. 17B is a cyclic voltammogram of copolymer P2.

Oxidation and reduction onset intercepts were deduced as $E_{ox}$=0.66 V and $E_{red}$=−1.91 V based on the cyclic voltammogram of P1 (FIG. 17A). The incorporation of these values into CV based Bredas equation ($E_{HOMO}$=[($E_{ox}$−$E_{ferrocene}$)+4.8] eV and $E_{LUMO}$=[($E_{red}$−$E_{ferrocene}$)+4.8] eV) led to the determination of HOMO and LUMO of P1 as 5.03 and 2.46 eV, respectively [48]. In a similar fashion, HOMO and LUMO values of P2 were calculated as 4.73 and 2.04 eV, respectively (FIG. 17B). The optical band gap values calculated by KM, CV and computational methods were found to be close.

Example 6

CA Measurements

A standard three electrode photocell system supported by an artificial solar simulator (OrielSol-3A) which calibrated with a silicon diode to 1 SUN power (100 mW cm$^{-2}$) and a potentiostat (AutoLab) was used for photoelectrochemical (PEC) measurements. The polymer-FTO coated substrate (photoanodes) served as the working electrode, a platinum (Pt) wire and a standard calomel electrode (SCE) were used as the auxiliary and reference electrodes, respectively. All these electrodes were immersed in a solution of 0.5 M $Na_2SO_4$ (pH 7.0), which was served as an electrolyte. The solar simulator was fitted with a UV light filter (UV cut off filter<420 nm) to assess visible light induced PEC water splitting performance of polymers.

Figure 7:
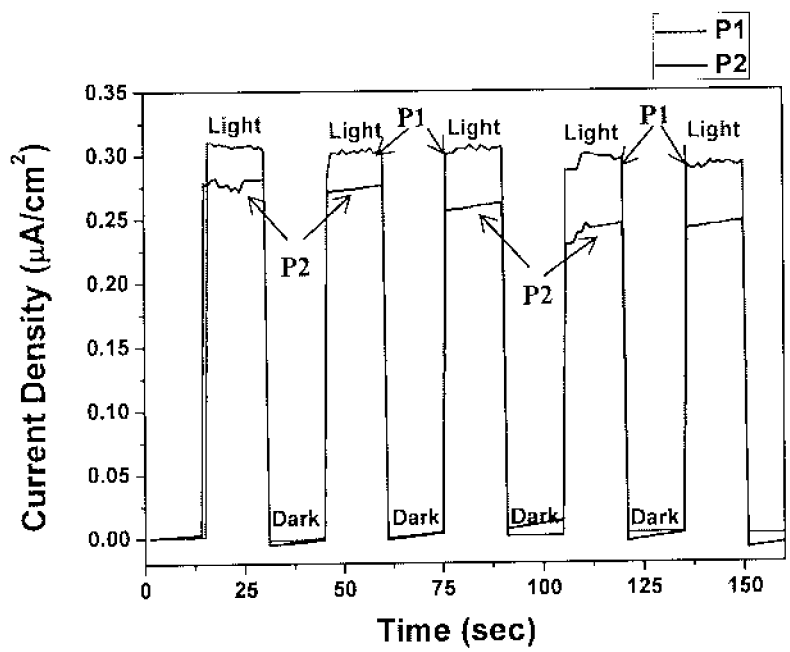
FIG. 7 is an overlay of chronoamperometric (CA) measurements of P1 and P2 copolymers deposited over FTO substrate, in which photocurrent densities were recorded at 0.6 V vs. saturated calomel electrode (SCE) bias in a standard three electrode system under dark ("Dark") and simulated solar light (1 Sun) ("Light").

FIG. 7 demonstrates the transient photocurrent response of the photoanodes at an applied potential of ~0.6 V while maintaining the on/off illumination with regular intervals of time (~15 sec). In stacked CA measurements, photo-current density was plotted as a function of time, which revealed that the photo-current density generated by photoanodes of P1-FTO and P2-FTO at ~0.6 V was 0.31 and 0.27 µA/cm$^2$, respectively (FIG. 7). The positive current densities suggested that OER was the dominant process in the water splitting at bias 0.6 V vs SCE [Seabold J A, Choi K-S. Effect of a cobalt-based oxygen evolution catalyst on the stability and the selectivity of photo-oxidation reactions of a $WO_3$ photoanode. Chem Mater 2011; 23:1105-12, incorporated herein by reference in its entirety]. Moreover, the extensive bubbling occurred on the electrode upon illumination was not observed in dark, which suggested visible light activation of the anode for OER. Furthermore, shifting of the $J_p$−t photocurrents to its normal baseline under dark (no illumination) suggested the response was reversible. These observations further proved that photocurrent generation by photoanodes was exclusively resulted from a solar driven water splitting reaction (FIG. 7).

The higher photocatalytic activity of P1 is attributed to its narrow band gap, which in turn improved its light harvesting capability to produce more sufficient charge carriers, as well as its larger surface area, as evident from SEM analysis (FIGS. 2A-B), which helped minimizing charge recombination and holding a longer transportation pathway for photo-generated excitons [Li L, Lo W, Cai Z, Zhang N, Yu L. Donor-Acceptor Porous Conjugated Polymers for Photocatalytic Hydrogen Production: The Importance of Acceptor Comonomer. Macromolecules 2016; 49:6903-9, incorporated herein by reference in its entirety]. Moreover, the drastic quenching of PL emission of P1 suggested that recombination of charges was effectively suppressed in P1 (FIG. 6), which was in agreement with our experimental observations. An earlier study has revealed that a large specific surface area in graphitic carbon nitride (g-$C_3N_4$) polymers led to the quenching of fluorescence [Wang X, Blechert S, and Antonietti M. Polymeric Graphitic Carbon Nitride for Heterogeneous Photocatalysis. ACS Catal., 2012; 2 (8):1596-1606, incorporated herein by reference in its entirety]. Moreover, the higher PEC activity of P1 is in line with the study of Zou et al. [Chu S, Wang Y, Wang C, Yang J, Zou Z. Bandgap modulation of polyimide photocatalyst for optimum H2 production activity under visible light irradiation. Int J Hydrogen Energy 2013; 38:10768-72, incorporated herein by reference in its entirety], which indicated that an increase in particle size of a polymer resulted in a higher probability of charge carrier recombination. In addition, a decrease in specific surface area would result in less available surface sites for photocatalytic reaction. Based on recent studies, PEC water splitting performance has been improved by increasing surface area and optimizing charge separation in g-$C_3N_4$ polymers [Wang X, Maeda K, Chen X, Takanabe K, Domen K, Hou Y, Fu X and Antonietti M. Polymer Semiconductors for Artificial Photosynthesis: Hydrogen Evolution by Mesoporous Graphitic Carbon Nitride with Visible Light. J. Am. Chem. Soc., 2009; 131 (5):1680-1681, incorporated herein by reference in its entirety]. The role of surface area in photocatalytic activity of OER has been extensively reviewed [Suen N T, Hung S F, Quan Q, Zhang Z, Xu Y J, Chen H M. Electrocatalysis for the oxygen evolution reaction: recent development and future perspectives. Chem. Soc. Rev., 2017, 46, 337, incorporated herein by reference in its entirety]. OER results found in our study are significant because an appreciable amount of photo-current density is generated at a neutral pH without the use of a cocatalyst.

Figure 8:
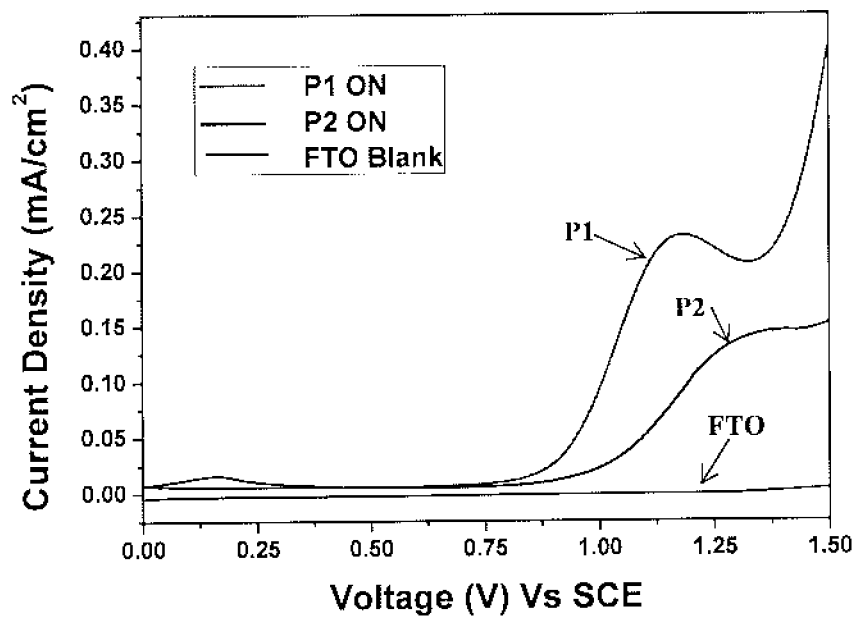
FIG. 8 is an overlay of linear sweep voltammograms (LSV) of P1 and P2 copolymers deposited over FTO substrate and blank FTO glass at a scan rate of −2.45 mV/sec in a standard three electrode system under simulated solar light (1 Sun).

The linear sweep voltammetry (LSV) measurement was performed at a scan rate of 2.45 mV/sec under dark or light conditions to measure the catalytic current as a function of potential. The SCE was calibrated against the reversible hydrogen potential (RHE) at room temperature. As illustrated in FIG. 8, a voltage scanning from 0 to 1.5 V dramatically enhanced the OER and maximum current densities for P1 and P2 were observed at 0.39 mA/cm$^2$ and 0.15 mA/cm$^2$, respectively. The onset potential for these copolymers was observed at around 0.73 V, which was followed by a strong oxidation rise in the voltammograms (FIG. 8).

Figure 9:
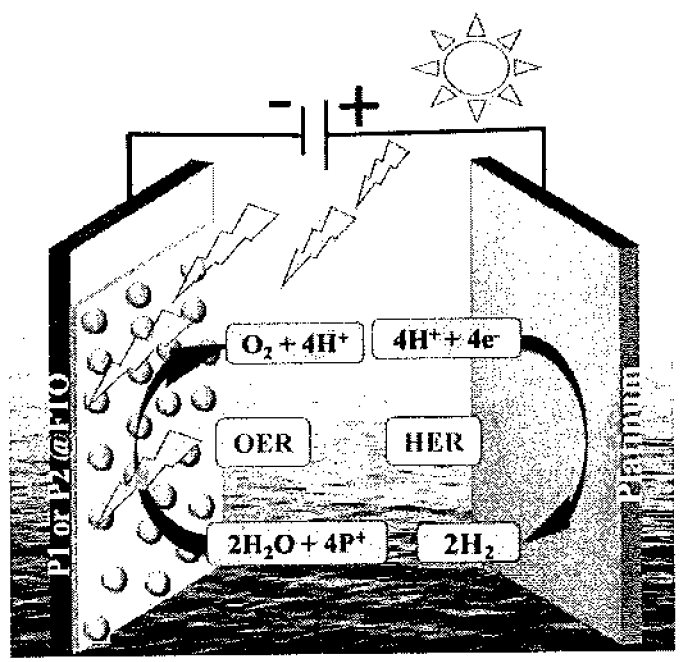
FIG. 9 depicts a proposed mechanism of water splitting.

The generated current densities at different potentials during the water splitting manifested that the reaction occurred dominantly at relatively high positive voltages. Earlier studies have suggested that an ideal HOMO and LUMO levels for HER (hydrogen evolution reaction) and OER (oxygen evolution reaction) should be at 4.44 and 5.67, respectively [Guiglion P, Butchosa C, Zwijnenburg M A. Polymer Photocatalysts for Water Splitting: Insights from Computational Modeling. Macromol Chem Phys 2016; 217: 344-53, incorporated herein by reference in its entirety]. Thus, the adjustment of essential energy required for appropriate HOMO-LUMO levels for the water splitting by P1 and P2 is achieved by using electromagnetic radiations and keeping a bias voltage at 0.6 V (FIG. 9).

Example 7

Stability Testing

Figure 10:
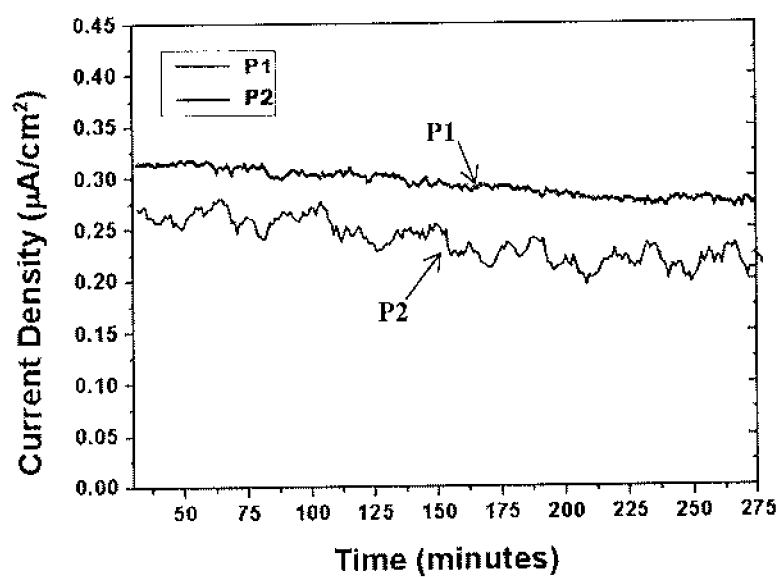
FIG. 10 shows stability testing of P1 and P2 copolymers deposited over FTO substrate by monitoring their current densities over a period of 275 min at an applied potential of 0.6 V vs. SCE bias in an aqueous solution of 0.5 M $Na_2SO_4$ at pH 7.0.

Long-term stabilities of these copolymers were tested via CA measurement at 0.6 V vs SCE under illumination at pH 7.0 (FIG. 10). It was observed that the generation of photocurrent was stable upon several hours of illumination. Further, these results revealed that the current density of P1 was more stable than P2. A decrease in current density from 0.31 to 0.29 $\mu A/cm^2$ (5%) after 275 minutes of illumination was observed for P1, whereas P2 showed a relatively higher decrease in the current density from 0.27 to 0.22 $\mu A/cm^2$ (20%) for the same period of time. The higher stability of P1 may be attributed to its larger surface area, which would help minimizing charge recombination. The drastic quenching of the PL emission of P1 is consistent with this observation. On the other hand, the photocorrosion of P2 may be due to its higher occurrence of charge recombination.

The invention claimed is:

1. A copolymer of formula (I)

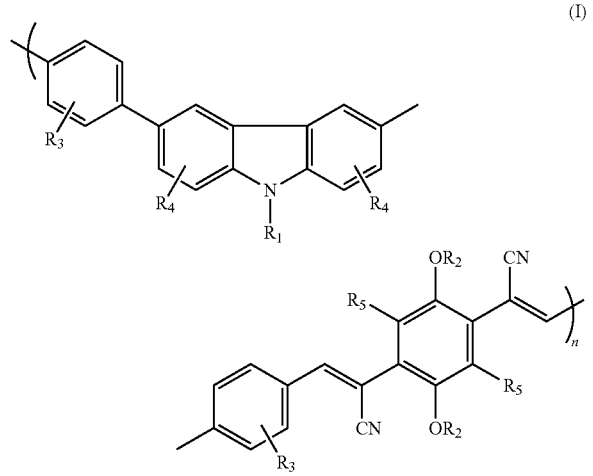

(I)

or a salt thereof, a solvate thereof, a tautomer thereof, a stereoisomer thereof, or a mixture thereof;

wherein:

$R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl;

each $R_2$ is independently selected from the group consisting of an optionally substituted alkyl, an optionally substituted cycloalkyl, an optionally substituted arylalkyl, and an optionally substituted aryl;

each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano;

each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl;

each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano; and n is a positive integer in a range of 2-10,000.

2. The copolymer of claim 1, wherein each $R_3$, $R_4$ and $R_5$ are a hydrogen;

$R_1$ is a hydrogen or an optionally substituted alkyl; and each $R_2$ is independently an optionally substituted alkyl.

3. The copolymer of claim 2, wherein $R_1$ is 2-ethylhexyl; and each $R_2$ is independently 2-ethylhexyl or dodecyl.

4. The copolymer of claim 1, which has a formula selected from the group consisting of

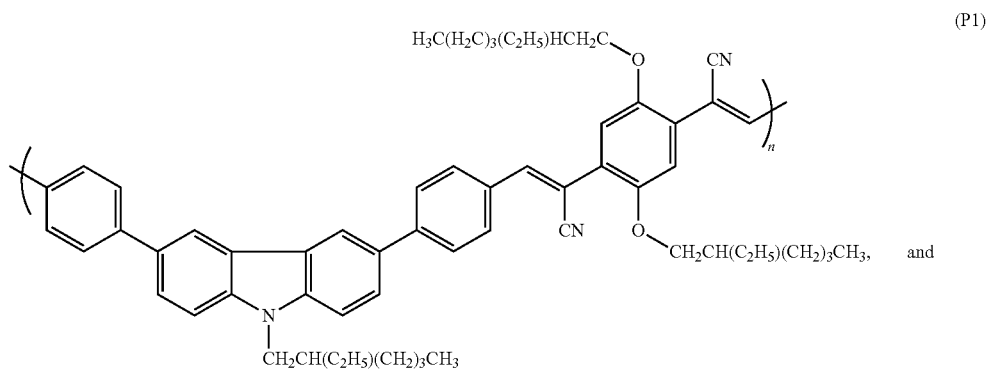

(P1)

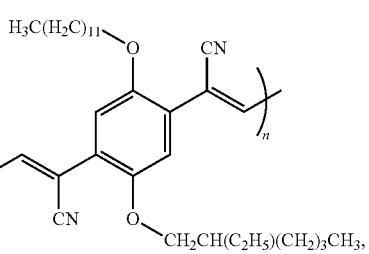
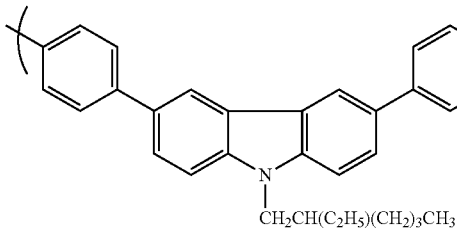

wherein n is a positive integer in the range of 2-10000 for each of formulae (P1) and (P2).

5. The copolymer of claim 1, which is in the form of microspheres having a diameter of 0.5-5 μm.

6. The copolymer of claim 1, which has a BET surface area of 30-120 m²/g, and a pore size of 8-25 Å.

7. The copolymer of claim 1, which has a band gap energy of 2.3-3.0 eV.

8. The copolymer of claim 1, which has a fluorescence emission peak of 510-570 nm upon excitation at a wavelength of 380-400 nm.

9. A method of producing the copolymer of claim 1, the method comprising:
reacting a dialdehyde of formula (II)

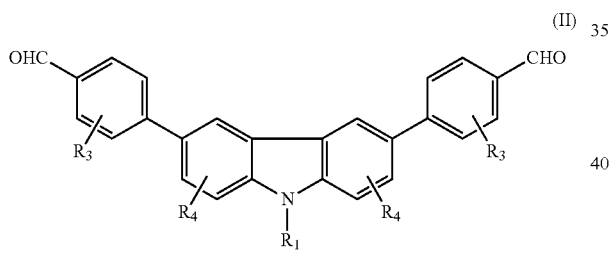

or a salt, solvate, tautomer or stereoisomer thereof, with a dinitrile of formula (III)

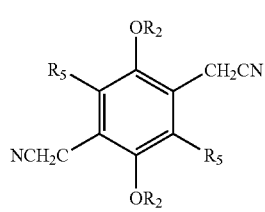

or a salt, solvate, tautomer or stereoisomer thereof in the presence of a base to form the copolymer, wherein:
$R_1$ is selected from the group consisting of a hydrogen, an optionally substituted alkyl, an optionally substituted cycloalkyl, an optionally substituted arylalkyl, an optionally substituted aryl, an optionally substituted alkanoyl, and an optionally substituted aroyl;
each $R_2$ is independently selected from the group consisting of an optionally substituted alkyl, an optionally substituted cycloalkyl, an optionally substituted arylalkyl, and an optionally substituted aryl;
each $R_3$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano;
each $R_4$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, and an optionally substituted aroyl; and
each $R_5$ is independently selected from the group consisting of a hydrogen, an optionally substituted alkyl, an optionally substituted cycloalkyl, an optionally substituted arylalkyl, an optionally substituted aryl, an optionally substituted alkoxy, an optionally substituted alkanoyl, an optionally substituted aroyl, a halogen, a nitro, and a cyano.

10. The method of claim 9, wherein a molar ratio of the dialdehyde of formula (II) to the dinitrile of formula (III) is in a range of 1:2 to 2:1.

11. A photoelectrode, comprising:
a metal oxide conducting substrate; and
a layer comprising the copolymer of formula (I) of claim 1 deposited over the metal oxide conducting substrate;
wherein the layer has a thickness in a range of 5-500 nm.

12. The photoelectrode of claim 11, wherein the metal oxide conducting substrate is fluorine doped tin oxide.

13. The photoelectrode of claim 11, which has an ultraviolet visible absorption with an onset absorption edge in a range of 450-550 nm.

14. A photoelectrochemical cell, comprising:
the photoelectrode of claim 11;
a counter electrode; and
an electrolyte solution comprising water and an inorganic salt in contact with both electrodes.

15. The photoelectrochemical cell of claim 14, wherein the electrolyte solution has an inorganic salt concentration of 0.05-1 M, and a pH in a range of 5-9.

16. The photoelectrochemical cell of claim 14, wherein the photoelectrode has a photo-current density in a range of 0.2-0.5 μA/cm² when the electrodes are subjected to a potential of 0.25 to 0.75 V under visible light irradiation.

17. The photoelectrochemical cell of claim 14, wherein the photoelectrode has a photo-current density in a range of 0.01-0.5 mA/cm$^2$ when the electrodes are subjected to a potential of 0.8 to 2.0 V under visible light irradiation.

18. The photoelectrochemical cell of claim 14, further comprising a reference electrode in contact with the electrolyte solution.

19. The photoelectrochemical cell of claim 16, wherein the photo-current density decreases by less than 25% after subjecting the electrodes to a potential of 0.25 to 0.75 V under visible light irradiation for 2-8 hours, relative to that measured immediately after the subjecting commences.

20. A method of splitting water into hydrogen gas and oxygen gas, the method comprising:
   subjecting the electrodes of the photoelectrochemical cell of claim 14 to a potential of 0.25 to 2.0 V; and
   concurrently irradiating the photoelectrochemical cell with visible light, thereby forming hydrogen gas and oxygen gas.

* * * * *